(12) United States Patent
Takeda

(10) Patent No.: US 9,446,792 B2
(45) Date of Patent: Sep. 20, 2016

(54) STEERING CONTROL DEVICE

(71) Applicant: Nissan Motor Co., Ltd., Yokohama-shi, Kanagawa (JP)

(72) Inventor: Yuya Takeda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/428,413

(22) PCT Filed: Oct. 1, 2013

(86) PCT No.: PCT/JP2013/076678
§ 371 (c)(1),
(2) Date: Mar. 16, 2015

(87) PCT Pub. No.: WO2014/054626
PCT Pub. Date: Apr. 10, 2014

(65) Prior Publication Data
US 2015/0274203 A1    Oct. 1, 2015

(30) Foreign Application Priority Data
Oct. 4, 2012    (JP) .................................. 2012-221790

(51) Int. Cl.
*A01B 69/00*    (2006.01)
*B62D 6/00*    (2006.01)
*B62D 11/00*    (2006.01)
*B62D 12/00*    (2006.01)
(Continued)

(52) U.S. Cl.
CPC ................ *B62D 6/008* (2013.01); *B62D 5/04* (2013.01); *B62D 15/025* (2013.01)

(58) Field of Classification Search
CPC ....... B62D 15/025; B62D 5/04; B62D 6/008

USPC .......................................................... 701/42
See application file for complete search history.

(56) References Cited

U.S. PATENT DOCUMENTS

| 5,717,590 A * | 2/1998 | Mihalko ................ B62D 6/007 180/443 |
| 2005/0216161 A1* | 9/2005 | Sakugawa ............. B60T 8/1755 701/70 |
| 2009/0240389 A1* | 9/2009 | Nomura ................. B62D 5/046 701/31.4 |

(Continued)

FOREIGN PATENT DOCUMENTS

CN    1468772 A    1/2004
CN    101028831 A    9/2007
(Continued)

*Primary Examiner* — Khoi Tran
*Assistant Examiner* — Harry Oh
(74) *Attorney, Agent, or Firm* — Global IP Counselors, LLP

(57) ABSTRACT

A steering control device includes a steering reaction force control unit that applies a steering reaction force to a steering unit in accordance with a steering reaction force characteristic that is based on steering torque and steering angle of the steering unit in which the steering torque increases as the steering angle increases. A curvature detection unit detects a curvature of a white line. An offset unit calculates an offset amount that increases as the detected curvature increases and that offsets the steering reaction force characteristic such that a neutral point of the steering is moved in a curve direction according to a magnitude of the detected curvature. A curve direction steering torque detection unit programmed to detect a steering torque in a curve direction. An offset suppression unit suppresses a change in the offset amount more as a detected steering torque in the curve direction increases.

13 Claims, 12 Drawing Sheets

(51) Int. Cl.
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2011.01)
*B62D 15/02* (2006.01)
*B62D 5/04* (2006.01)

(56) References Cited

U.S. PATENT DOCUMENTS

| | | | | |
|---|---|---|---|---|
| 2009/0326761 | A1* | 12/2009 | Nitta | B60T 8/1755 |
| | | | | 701/41 |
| 2010/0138112 | A1* | 6/2010 | Suzuki | B62D 6/002 |
| | | | | 701/42 |
| 2014/0012469 | A1* | 1/2014 | Kunihiro | B60W 40/072 |
| | | | | 701/41 |

FOREIGN PATENT DOCUMENTS

| | | |
|---|---|---|
| EP | 2902300 A1 | 8/2015 |
| EP | 2902301 A1 | 8/2015 |
| EP | 2902302 A1 | 8/2015 |
| JP | 4-38270 A | 2/1992 |
| JP | 11-78938 A | 3/1999 |
| JP | 11-198844 A | 7/1999 |
| JP | 2006-15871 A | 1/2006 |
| JP | 2008-1117 A | 1/2008 |
| JP | 2010-30504 A | 2/2010 |
| JP | 2010-132100 A | 6/2010 |
| JP | 2010-188976 A | 9/2010 |
| JP | 2010-280289 A | 12/2010 |

* cited by examiner

STEERING CONTROL DEVICE

CROSS-REFERENCE TO RELATED APPLICATIONS

This application is a U.S. National stage application of International Application No. PCT/JP2013/076678, filed Oct. 1, 2013, which claims priority to Japanese Patent Application No. 2012-221790 filed in Japan on Oct. 4, 2012.

BACKGROUND

1. Field of the Invention

The present invention relates to a steering control device.

2. Background Information

Japanese Laid-Open Patent Application No. 1999-78938 discloses a technology that aims to smoothly pass at a curve and in which the steering reaction force that is applied to a steering wheel corresponding to a self-aligning torque (SAT) is made to decrease as the curvature while turning increases.

SUMMARY

In the prior art described above, there is a problem that the steering reaction force characteristic changes with respect to the self-aligning torque, imparting discomfort to the driver. The object of the present invention is to provide a steering control device that is capable of reducing the discomfort imparted to the driver.

In the present invention, an offset amount that increases as the curvature increases is calculated; a steering reaction force characteristic is set to coordinates, of which the coordinate axes are the self-aligning torque and the steering reaction force, so that the self-aligning torque increases as the steering reaction force increases; and the steering reaction force characteristic is offset at the coordinates only by the offset amount in a direction corresponding to a sign of the self-aligning torque. At this time, a change in the offset amount is suppressed more as the steering torque in the curve direction increases.

Thus, changing the steering reaction force in a state of maintaining the steering reaction force characteristic is possible, and the discomfort imparted to the driver can be reduced.

BRIEF DESCRIPTION OF THE DRAWINGS

Referring now to the attached drawings which form a part of this original disclosure.

DETAILED DESCRIPTION OF THE EMBODIMENTS

Figure 1:
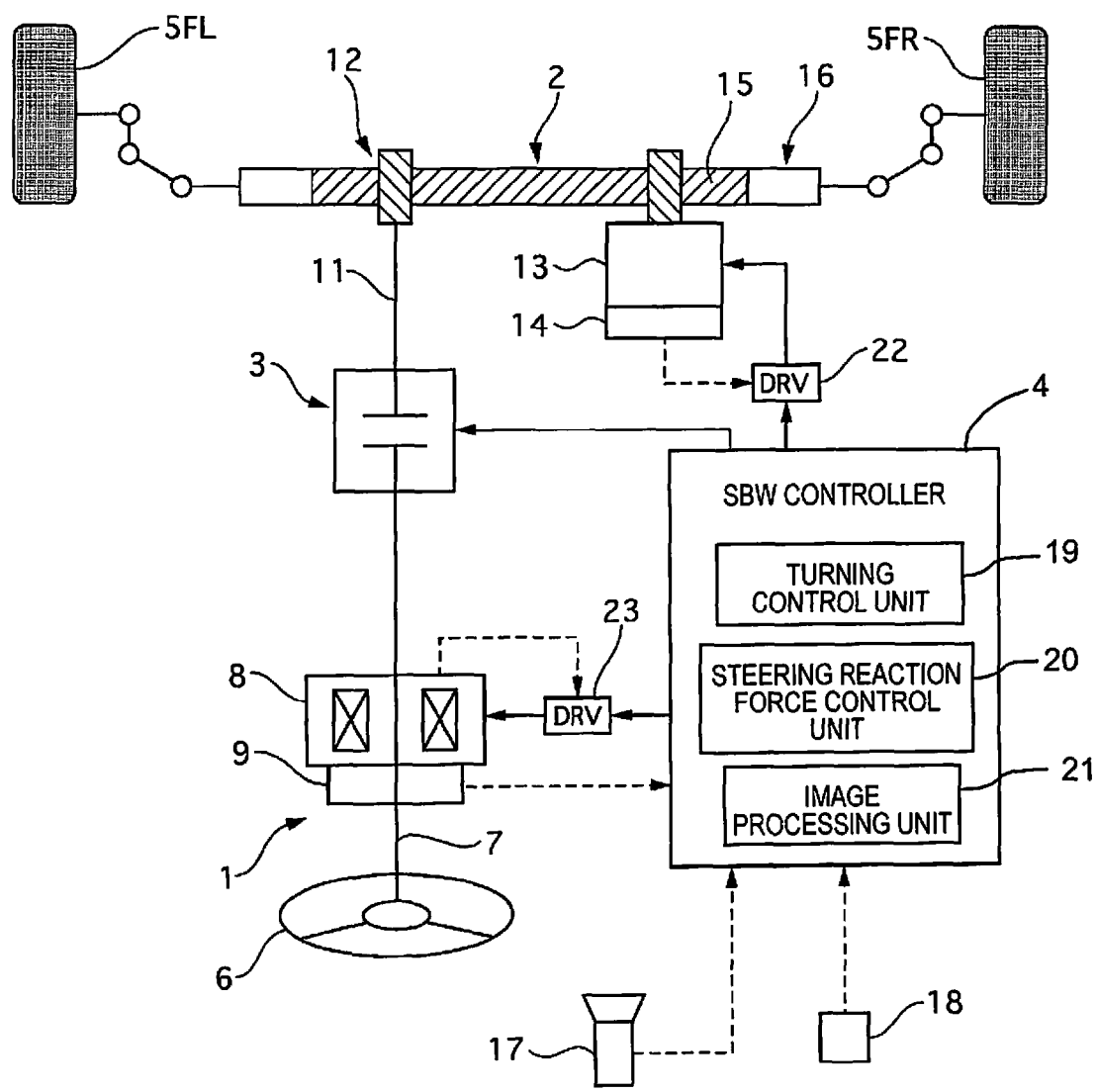
FIG. 1 is a system view illustrating the steering system of a vehicle of the first embodiment.

FIG. 1 is a system view illustrating a steering system of a vehicle of the first embodiment.

The steering device of the first embodiment is mainly configured by a steering unit 1, a turning unit 2, a backup clutch 3, and an SBW controller 4, and the device employs a steer-by-wire (SBW) system in which the steering unit 1, which receives steering input from a driver and the turning unit 2, which turns a left and a right front wheel (the turnable wheels) 5FL, 5FR are mechanically separated.

The steering unit 1 is provided with a steering wheel 6, a column shaft 7, a reaction force motor 8, and a steering angle sensor 9. The column shaft 7 rotates integrally with the steering wheel 6. The reaction force motor 8 is, for example, a brushless motor, and a coaxial motor in which the output shaft is coaxial with the column shaft 7 outputs a steering reaction force torque to the column shaft 7 in response to a command from the SBW controller 4. The steering angle sensor 9 detects the absolute rotation angle of the column shaft 7, that is, the steering angle of the steering wheel 6.

The turning unit 2 is provided with a pinion shaft 11, a steering gear 12, a turning motor 13, and a turning angle sensor 14. The steering gear 12 is a rack-and-pinion-type steering gear, which turns the front wheels 5L, 5R in response to the rotation of the pinion shaft 11. The turning motor 13 is, for example, a brushless motor, in which the output shaft is connected to a rack gear 15 via an unillustrated decelerator, and this motor outputs a turning torque for turning the front wheel 5 to a rack 16 in response to a command from the SBW controller 4. The turning angle sensor 14 detects the absolute rotation angle of the turning motor 13. Since there is an always uniquely determined correlation between the rotation angle of the turning motor 13 and the turning angle of the front wheel 5, the turning angle of the front wheel 5 can be detected based on the rotation angle of the turning motor 13. Herein below, unless specifically described, the turning angle of the front wheel 5 shall be that which is calculated based on the rotation angle of the turning motor 13. The backup clutch 3 is provided between the column shaft 7 of the steering unit 1 and the pinion shaft 11 of the turning unit 2, and the steering unit 1 and the turning unit 2 are detached by a release; the steering unit 1 and the turning unit 2 are mechanically connected by the fastening thereof.

In addition to the steering angle sensor 9 and the turning angle sensor 14 described above, The vehicle speed (the vehicle body speed) detected by an image of the traveling road in front of the host vehicle captured by a camera 17 and a vehicle speed sensor 18 are input into the SBW controller 4. The SBW controller 4 comprises a turning control unit 19 for controlling the turning angle of the front wheels 5FL, 5FR, a steering reaction force control unit (a steering reaction force control means, a controller) 20 for controlling the steering reaction force torque applied to the column shaft 7, and an image processing unit 21. The turning control unit 19 generates a command turning angle based on each piece of input information and outputs the generated command turning angle to an electric current driver 22. The electric current driver 22 controls the command electric current to the turning motor 13 by an angle feedback for matching the actual turning angle detected by the turning angle sensor 14 with the command turning angle. The steering reaction force control unit 20 generates a command steering reaction force torque based on each piece of input information and outputs the generated command steering reaction force torque to an electric current driver 23. The electric current driver 23 controls the command electric current to the reaction force motor 8 by a torque feedback for matching the actual steering reaction force torque that is inferred from the current value of the reaction force motor 8 with the command steering reaction force torque. The image processing unit 21 recognizes a traveling lane left and right white lines (the traveling path dividing lines) by image processing, such as by edge extraction from an image of a traveling path in front of a host vehicle captured by a camera 17. In addition, when the SBW system fails, the SBW controller 4 fastens the backup clutch 3 and mechanically couples the steering unit 1 and the turning unit 2, allowing the rack 16 to move in the axial direction by steering the steering wheel 6. At this time, a control corresponding to an electric power steering system for assisting the steering force of the driver by an assist torque of the turning motor 13 can be executed. The SBW system described above may be a redundant system provided with a plurality of each sensor, each controller, and each motor. Additionally, the turning control unit 19 and the steering reaction force control unit 20 may be separate bodies.

In the first embodiment, stability control and corrective steering reduction control are executed with the aim of reducing the corrective steering amount and reducing the burden of steering for the driver. Stability control aims to improve the safety of a vehicle with respect to disturbance (crosswind, uneven road surfaces, ruts, road surface cants, etc.), and performs two feedback (F/B) controls.

1. Yaw angle F/B control

The yaw angle generated by disturbance is reduced by correcting the turning angle in accordance with the yaw angle, which is the angle between the white line and the host vehicle traveling direction.

2. Lateral position F/B control

The lateral position change, which is the integrated value of the yaw angles generated by disturbance, is reduced by correcting the turning angle in accordance with the distance to the white line (the lateral position).

The corrective steering reduction control aims to improve the safety of a vehicle with respect to the steering input from the driver and performs three reaction force offset controls.

1. Reaction force offset control corresponding to the lateral position

The steering reaction force characteristic corresponding to the self-aligning torque (SAT) is offset in a direction in which the absolute value of the steering reaction force becomes larger in accordance with the lateral position in order to suppress the sign of the steering torque from being inverted when a driver performs corrective steering that straddles the steering angle neutral position.

2. Reaction offset control corresponding to the deviation margin time.

The steering reaction force characteristic corresponding to the self-aligning torque is offset in a direction in which the absolute value of the steering reaction force becomes larger in accordance with the deviation margin time (the time required to reach the white line) in order to suppress the sign of the steering torque from being inverted when a driver performs corrective steering that straddles the steering angle neutral position.

3. Reaction force offset control corresponding to the curvature.

The steering reaction force characteristic corresponding to the self-aligning torque is offset in a direction corresponding to a sign of the self-aligning torque and by an amount in accordance with the curvature of the white line in order to reduce the steering retention force of the driver and to suppress a change in the steering retention angle with respect to a change in the steering retention force when turning.

Turning Control Unit

Figure 2:
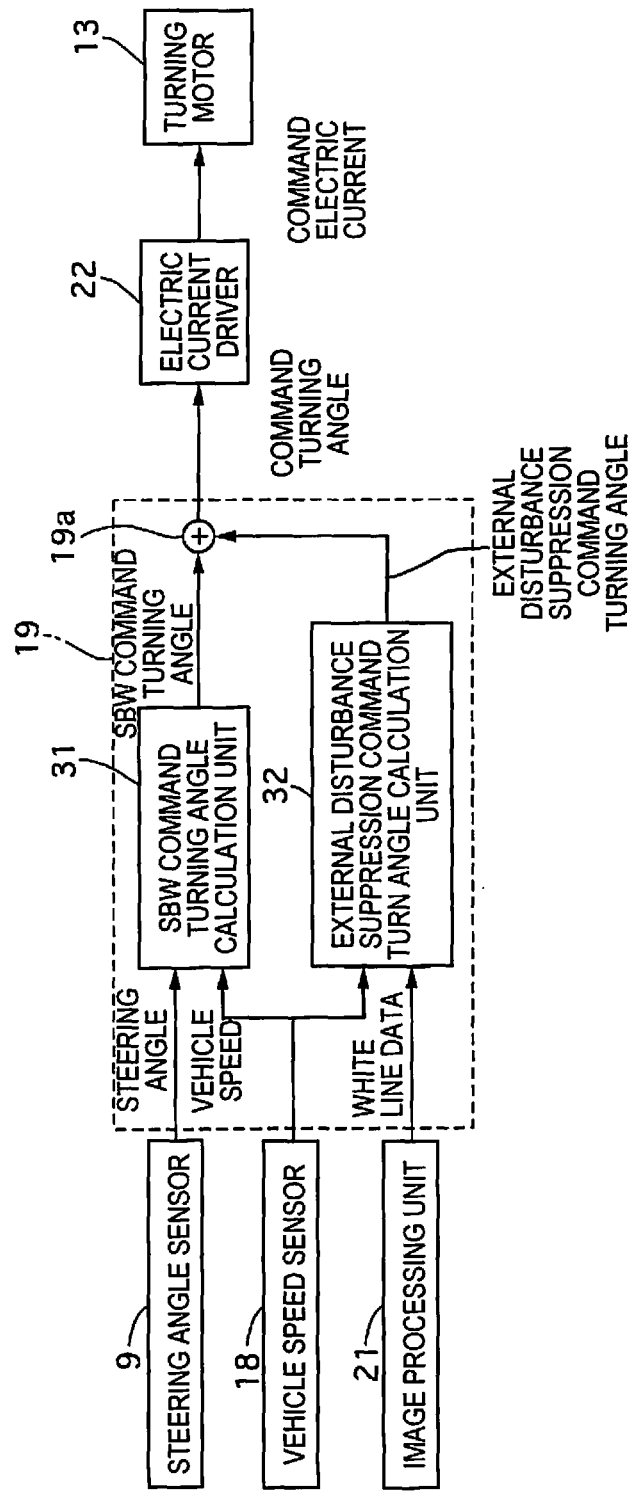
FIG. 2 is a control block view of the turning control unit 19.

FIG. 2 is a control block view of the turning control unit 19. The SBW command turning angle calculation unit 31 calculates an SBW command turning angle based on the steering angle and the vehicle speed. The external disturbance suppression command turning angle calculation unit 32 calculates an external disturbance suppression command turning angle for correcting the SBW command turning angle during stability control, based on the vehicle speed and the white line data. The details of the external disturbance suppression command turning angle calculation unit 32 will be described below. The adder 19a outputs a value obtained by adding the SBW command turning angle and the external disturbance suppression command turning angle and outputs the value obtained to the electric current driver 22 as the final command turning angle.

Steering Reaction Force Control Unit

Figure 3:
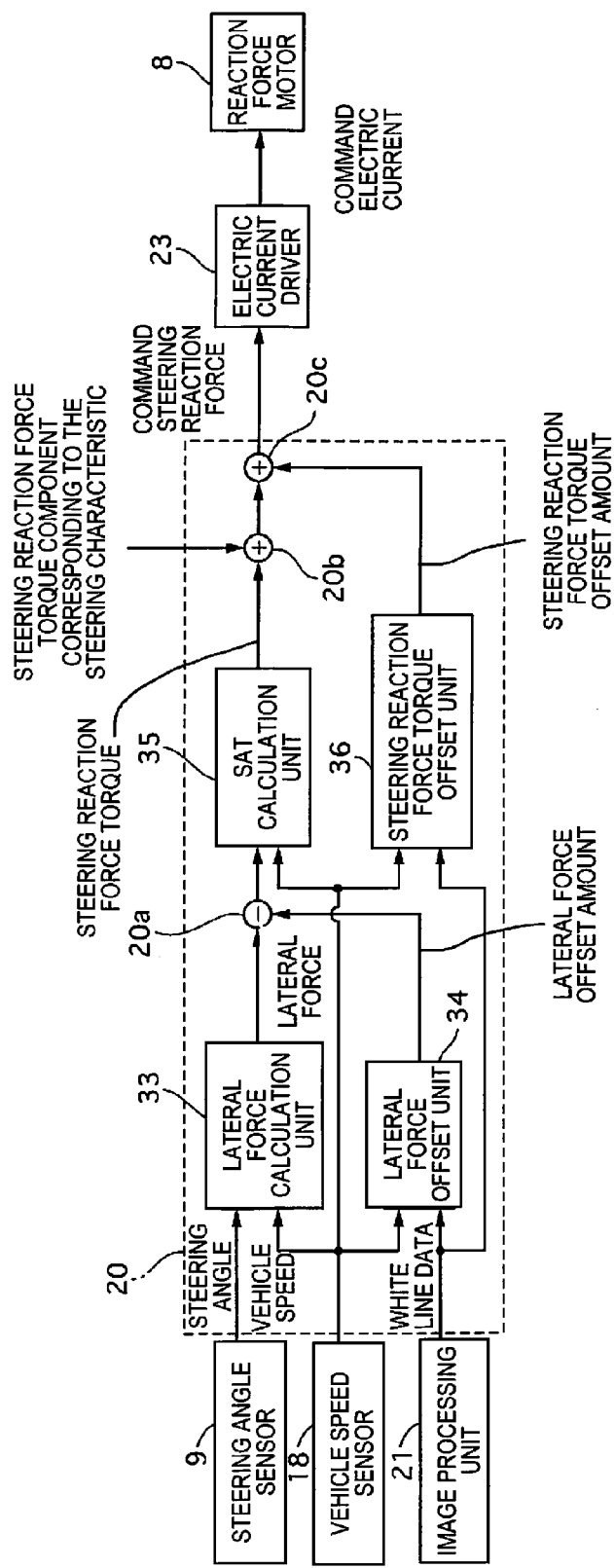
FIG. 3 is a control block view of a steering reaction force control unit 20.

FIG. 3 is a control block view of a steering reaction force control unit 20. The lateral force calculation unit 33 calculates a tire lateral force by referencing a steering angle-lateral force conversion map representing the relationship between the steering angle and the tire lateral force per vehicle speed in a conventional steering device, which has been obtained by experimentation or another means beforehand, based on the steering angle and the vehicle speed. The steering angle-lateral force conversion map has a characteristic in which the tire lateral force increases as the steering angle increases; the change amount of the tire lateral force with respect to the change amount of the steering angle is larger when the steering angle is small, as compared to when large; and the tire lateral force becomes smaller as the vehicle speed increases. The lateral force offset unit (the offset means) 34 calculates a lateral force offset amount for offsetting the steering reaction force characteristic in a reaction force offset control corresponding to the curvature, based on the vehicle speed and the white line data. The details of the lateral force offset unit 34 will be described below. The subtracter 20a subtracts the lateral force offset amount from the tire lateral force. The SAT calculation unit 35 calculates a steering reaction force torque that is generated by the tire lateral force by referencing a lateral force-steering reaction force torque conversion map, representing the relationship between the tire lateral force and the steering reaction force torque in a conventional steering device obtained by experimentation or another means beforehand, based on the vehicle speed and the tire lateral force after an offset by the lateral force offset amount. The tire lateral force-steering reaction force torque conversion map has a characteristic in which the steering reaction force torque is larger as the tire lateral force increases; the change amount of the steering reaction force torque with respect to the change amount of the tire lateral force is larger when the tire lateral force is small, as compared to when large; and the steering reaction force torque becomes smaller as the vehicle speed increases. This characteristic simulates a reaction force that is generated in the steering wheel by the self-aligning torque of wheels trying to return to a straight state, which is generated by the road surface reaction force in a conventional steering device.

The adder 20b adds a steering reaction force torque component (a spring item, a viscous item, an inertia item) corresponding to the steering reaction force torque and the steering characteristic. The spring item is a component that is proportional to the steering angle and is calculated by multiplying a predetermined gain and the steering angle. The viscous item is a component proportional to the steering angular velocity and is calculated by multiplying a predetermined gain and the steering angular velocity. The inertia item is a component that is proportional to the steering angular acceleration and is calculated by multiplying a predetermined gain and the steering angular acceleration. The steering reaction force torque offset unit 36 calculates a steering reaction force torque offset amount for offsetting the steering reaction force characteristic in a reaction force offset control corresponding to the lateral position or the deviation margin time, based on the vehicle speed and the image of a traveling path in front of the host vehicle. The details of the steering reaction force torque offset unit 36 will be described below. The adder 20c outputs a value obtained by adding the steering reaction force torque, after adding a steering reaction force torque component corresponding to the steering characteristic, and the steering torque offset amount to the electric current driver 23 as the final command steering reaction force torque.

External Disturbance Suppression Command Turning Angle Calculation Unit

Figure 4:
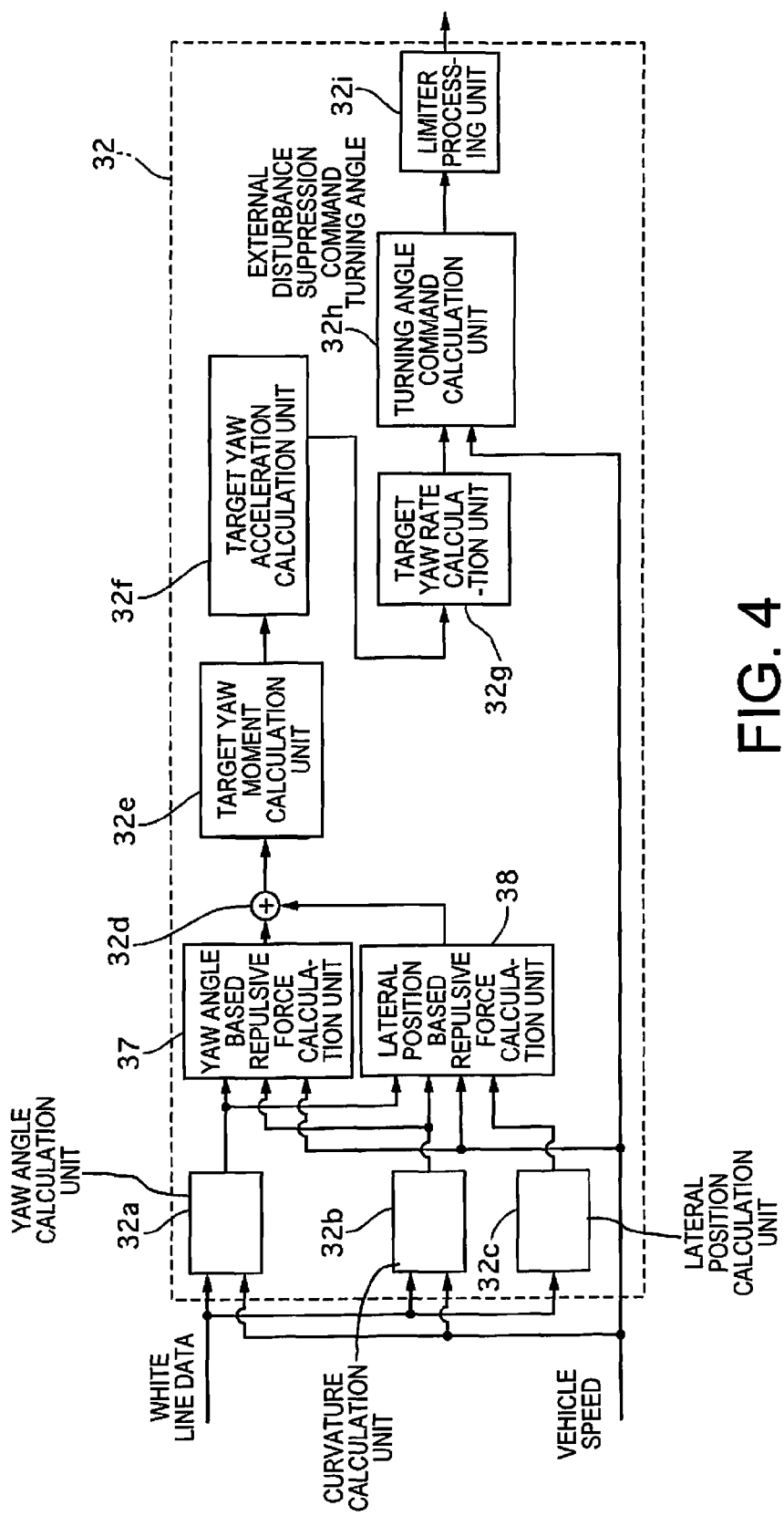
FIG. 4 is a control block view of an external disturbance suppression command turning angle calculation unit 32.

FIG. 4 is a control block view of an external disturbance suppression command turning angle calculation unit 32. The yaw angle calculation unit 32a calculates the yaw angle, which is an angle between the white line in a forward fixation point and the traveling direction of the host vehicle. The yaw angle at the forward fixation point shall be the angle formed between the white line after a predetermined time (for example, 0.5 seconds) and the traveling direction of the host vehicle. The yaw angle can be easily and precisely detected by calculating the yaw angle based on an image of the traveling path captured by the camera 17. The curvature calculation unit 32b calculates the curvature of the white line at the forward fixation point.

The lateral position calculation unit 32c calculates the distance to the white line at the forward fixation point. The repulsive force calculation unit 37 corresponding to the yaw angle calculates the repulsive force of the vehicle for reducing the yaw angle that is generated by disturbance in a yaw angle FB control, based on the yaw angle, the curvature, and the vehicle speed. The details of the repulsive force calculation unit 37 corresponding to the yaw angle will be described below.

The repulsive force calculation unit 38 corresponding to the lateral position calculates the repulsive force of the vehicle for reducing the lateral position change that is generated by disturbance in a lateral position FB control, based on the yaw angle, the curvature, the vehicle speed, and the distance to the white line at the forward fixation point. The details of the repulsive force calculation unit 38 corresponding to the lateral position will be described below. The adder 32d adds a repulsive force corresponding to the yaw angle and a repulsive force corresponding to the lateral position and calculates the lateral direction repulsive force. The target yaw moment calculation unit 32e calculates a target yaw moment based on the lateral direction repulsive force, the wheelbase (the distance between the axles), the rear wheel axle load, and the front wheel axle load. Specifically, a value multiplying the ratio of the rear wheel axle load, with respect to the vehicle weight (the front wheel axle load+the rear wheel axle load), and the wheelbase, with respect to the lateral direction repulsive force, shall be the target yaw moment. The target yaw acceleration calculation unit 32f calculates the target yaw acceleration by multiplying a yaw inertia moment coefficient and the target yaw moment. The target yaw rate calculation unit 32g calculates a target yaw rate by multiplying the headway time and the target yaw acceleration.

The command turning angle calculation unit 32h calculates the external disturbance suppression command turning angle $\delta_{st}^*$ by referencing the following formula, based on the target yaw rate $\phi^*$, the wheelbase WHEEL BASE, the vehicle speed V, and the characteristic velocity of the vehicle $V_{ch}$. Here, the characteristic velocity of the vehicle $V_{ch}$ is a parameter in the well-known "Ackerman Equation," representing the self-steering characteristics of the vehicle.

$$\delta_{st}{}^* = (\phi^* \times \text{WHEEL\_BASE} \times (1 + (V/vCh)^2) \times 180)/(V \times M\_PI)$$

where M_PI is a predetermined coefficient.

The limiter processing unit 32i limits the maximum value and the change rate of the external disturbance suppression command turning angle $\delta_{st}{}^*$. In a conventional steering device (in which the steering unit and the turning unit are mechanically connected), when the steering angle of the steering wheel 6 in an angle range of the play near the neutral position (for example, 3° to the left and right), the maximum value shall be the turning angle range of the front wheels 5FL, 5FR corresponding to the range of the play (for example, 0.2° to the left and right).

Figure 5:
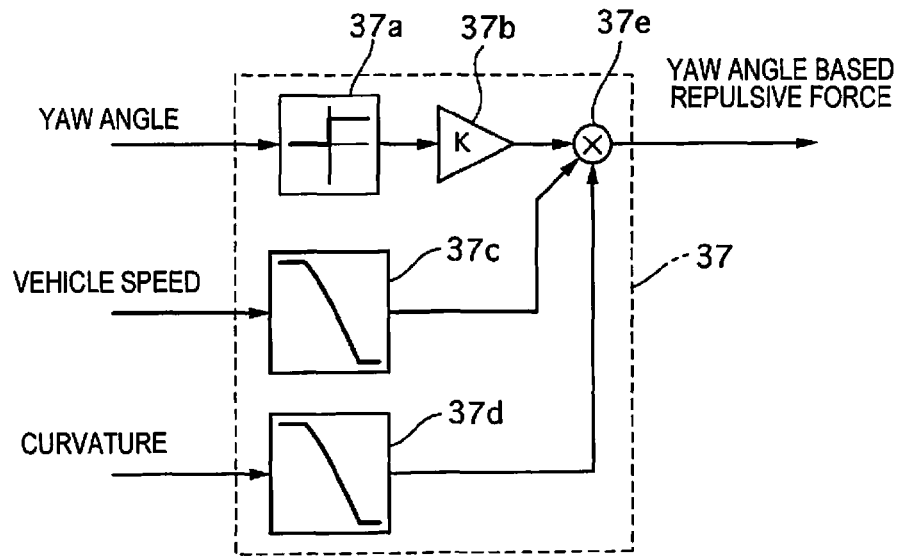
FIG. 5 is a control block view of a repulsive force calculation unit 37 corresponding to the yaw angle.

FIG. 5 is a control block view of the repulsive force calculation unit 37 corresponding to the yaw angle. The upper and lower limiter 37a executes an upper and lower limiter operation on the yaw angle. When the yaw angle is a positive value (the yaw angle is positive when the white line intersects a line extending in the host vehicle traveling direction), the upper and lower limiter sets the value to be equal to or greater than a predetermined value that is capable of suppressing disturbance, sets the value generated by the steering of the driver to be less than a value when the vehicle will vibrate and a value that is generated by the steering of the driver (for example, 1°), and sets the value to be 0 when the yaw angle is negative. The yaw angle F/B gain multiplication unit 37b multiplies a yaw angle F/B gain and the yaw angle after the limiter processing. The yaw angle F/B gain shall be equal to or greater than a predetermined value that will avoid shortage in the control amount while securing responsiveness, less than a value when the vehicle will vibrate, and a value at which the driver will feel a misalignment in the neutral positions of the steering angle and the turning angle.

The vehicle speed correction gain multiplication unit 37c multiplies the vehicle speed correction gain and the vehicle speed. The vehicle speed correction gain shall have a characteristic in which the maximum value is within the range of 0-70 km/h, gradually decreasing within the range of 70-130 km/h, and becoming the minimum value (0) within the range of equal to or greater than 130 km/h. The curvature correction gain multiplication unit 37d multiplies the curvature correction gain and the curvature. The curvature correction gain shall have a characteristic of becoming smaller as the curvature become greater, and an upper limit and a lower limit (0) are set thereon. The multiplier 37e multiplies each of the outputs from the yaw angle F/B gain multiplication unit 37b, the vehicle speed correction gain multiplication unit 37c, and the curvature correction gain multiplication unit 37d to determine a repulsive force corresponding to the yaw angle.

Figure 6:
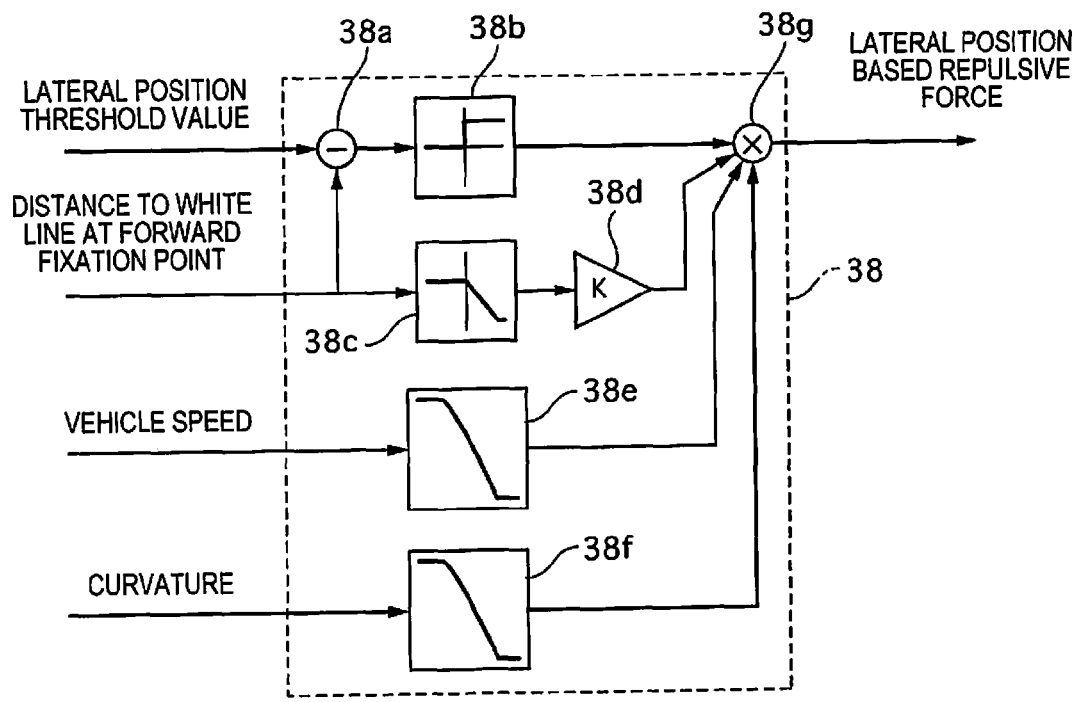
FIG. 6 is a control block view of a repulsive force calculation unit 38 corresponding to the lateral position.

FIG. 6 is a control block view of a repulsive force calculation unit 38 corresponding to the lateral position. The subtracter 38a determines a lateral position deviation by subtracting the distance to the white line at the forward fixation point from a lateral position threshold value that has been set beforehand (for example, 90 cm). The upper and lower limiter 38b executes an upper and lower limiter operation on the lateral position deviation. The upper and lower limiter takes a predetermined positive value when the lateral position deviation is a positive value; this value is 0 when the lateral position deviation is a negative value. The distance correction gain multiplication unit 38c multiplies the distance correction gain and the distance to the white line at the forward fixation point. The distance correction gain shall have a characteristic taking the maximum value when the distance to the white line is equal to or less than a predetermined value and of becoming smaller as the distance becomes longer when exceeding the predetermined value, and a lower limit is set thereon.

The lateral position F/B gain multiplication unit 38d multiplies the lateral position F/B gain and the distance to the white line after a correction has been made by the distance correction gain multiplication unit 38c. The lateral position F/B gain shall be equal to or greater than a predetermined value that will avoid shortage in the control amount while securing responsiveness, =less than a value when the vehicle will vibrate, and a value at which the driver will feel a misalignment in the neutral positions; this is also set to be a value that is less than the yaw angle FB gain of the yaw angle F/B gain calculation unit 37b. The vehicle speed correction gain multiplication unit 38e multiplies the vehicle speed correction gain and the vehicle speed. The vehicle speed correction gain shall have a characteristic that the maximum value is within the range of 0-70 km/h, gradually decreasing within the range of 70-130 km/h, and becoming the minimum value (0) within the range of equal to or greater than 130 km/h. The curvature correction gain multiplication unit 38f multiplies the curvature correction gain to the curvature. The curvature correction gain shall have a characteristic of becoming smaller as the curvature increases, and an upper limit and a lower limit (0) are set thereon. The multiplier 38g multiplies each of the outputs from the lateral position F/B gain multiplication unit 38d, the vehicle speed correction gain multiplication unit 38e, and the curvature correction gain multiplication unit 38f to determine a repulsive force corresponding to the lateral position.

Stability Control Effect

Figure 7:
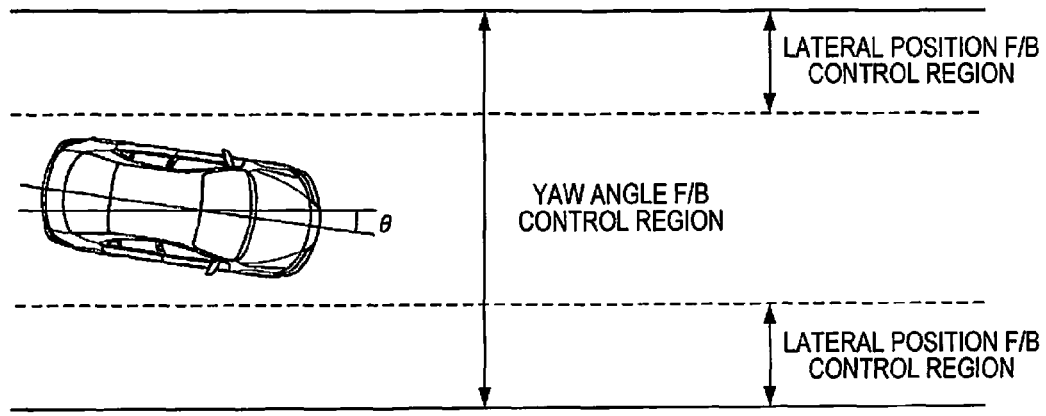
FIG. 7 is a view illustrating a control region of the yaw angle F/B control and the lateral position F/B control.

In the first embodiment, a yaw angle F/B control for reducing the yaw angle generated by disturbance and a lateral position F/B control for reducing the lateral position change, which is the integrated value of the yaw angles generated by the disturbance, are executed as stability control. The yaw angle F/13 control is executed regardless of the lateral position when a yaw angle is generated, and the lateral position F/B control is executed when the distance to the white line becomes equal to or less than a predetermined lateral position threshold value (90 cm). That is, the vicinity of the center of the traveling lane becomes a dead zone for the lateral position F/B control. The control ranges of the two F/B controls are illustrated in FIG. 7. ϕ is the yaw angle.

Figure 8:
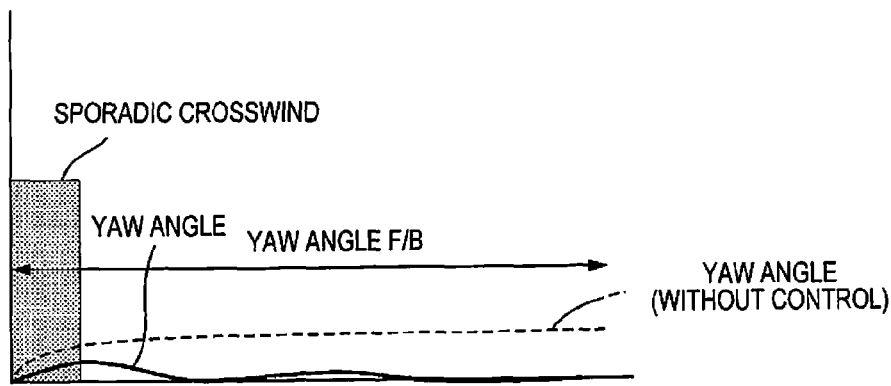
FIG. 8 is a time chart illustrating the yaw angle change when a vehicle traveling on a straight road of a highway receives a sporadic crosswind.

FIG. 8 is a time chart illustrating the yaw angle change when a vehicle traveling on a straight road of a highway receives a sporadic crosswind, and the vehicle is assumed to be traveling in the vicinity of the center of the traveling lane. In the yaw angle F/B control, when the vehicle receives a sporadic crosswind and a yaw angle is generated, a repulsive force corresponding to the yaw angle is calculated, an external disturbance suppression command turning angle for obtaining the repulsive force is determined, and the SBW command turning angle based on the steering angle and vehicle speed is corrected. When a vehicle travels along the traveling lane, especially on a straight road, the direction of the white line and the host vehicle traveling direction match, so the yaw angle will be zero. That is, in the yaw angle F/B control of the first embodiment, the yaw angle is assumed to be generated by disturbance; therefore, enhancing the safety of the vehicle with respect to disturbance, especially while traveling straight by reducing the yaw angle, is possible, and reducing the corrective steering amount of the driver is possible.

Conventionally, as those that suppress the effect of disturbance such as crosswind to the vehicle behavior, that which applies a turning torque for external disturbance suppression to the steering system is known in a conventional steering device, and that which applies a steering reaction force component that promotes turning for external disturbance suppression in known in an SBW system. However, fluctuation in the steering reaction force is generated in these conventional steering devices, imparting discomfort to the driver. In contrast, in the stability control comprising the yaw angle F/B control of the first embodiment, by focusing attention on the point that the steering wheel 6 and the front wheels 5L, 5R can be independently controlled, which is a characteristic of an SBW system in which the steering wheel 6 and the front wheels 5L and 5R are mechanically separated, the turning angle of the front wheels 5L, 5R are controlled based on a command turning angle that adds the SBW command turning angle corresponding to the steering angle and the vehicle speed and the external disturbance suppression command turning angle corresponding to the yaw angle, while a tire lateral force is inferred based on the steering angle and vehicle speed,; the steering reaction force is controlled based on the command steering reaction force corresponding to the inferred tire lateral force and the vehicle speed. That is, since a turning angle for suppressing disturbance is directly applied to the front wheels 5L, 5R, applying a steering reaction force component that promotes turning for external disturbance suppression becomes unnecessary. Furthermore, by applying a steering reaction force corresponding to the tire lateral force inferred from the steering angle, fluctuation in the tire lateral force generated by turning for external disturbance suppression will not be reflected on the steering reaction force; as a result, the discomfort imparted to the driver can be reduced. In a conventional SBW system, the tire lateral force is inferred from a rack axial force or the turning angle detected by a sensor, and a steering reaction force corresponding to the inferred tire lateral force is applied. Consequently, fluctuation in the tire lateral force generated by turning for external disturbance suppression will always be reflected in the steering reaction force, creating a discomfort for the driver. In the first embodiment, only the tire lateral force that is generated by the steering of the driver is reflected On the steering reaction force, and the steering reaction force does not fluctuate due to turning for external disturbance suppression; therefore, the discomfort imparted to the driver can be reduced.

Here, a misalignment of the neutral positions of the steering angle and the turning angle becomes a problem when applying a turning angle for suppressing disturbance directly onto the front wheels 5L, 5R; however, in the first embodiment, the external disturbance suppression command turning angle is set to a turning angle range of the front wheels 5FL, 5FR (0.2° to the left and right), corresponding to the range of play, when the steering wheel 6 is in the angle range of the play in the vicinity of the steering angle neutral position (3° to the left and right) in a conventional steering device. The generation of yaw angle by disturbance is more notable when traveling straight than when turning; when traveling straight, the steering angle is positioned in the vicinity of the steering angle neutral position. In other words, since correcting the turning angle by the yaw angle FB control is mostly executed in the vicinity of the steering angle neutral position, suppressing the discomfort that accompanies a neutral misalignment is possible by suppressing the neutral misalignment amount between the steering angle and the turning angle, which accompanies the application of the external disturbance suppression command turning angle, in the range of the play of the steering. Additionally, since the external disturbance suppression command turning angle is limited to the range of 0.2° to the left and right, the driver is able to change the traveling direction of the vehicle in the desired direction by the steering input, even during stability control. That is, since the correction amount of the turning angle by the external disturbance suppression command turning angle is minute with respect to the change amount of the turning angle generated by the steering input of the driver, enhancing the safety of the vehicle with respect to disturbance is possible without interfering with the steering by the driver.

Conventionally, a lane departure prevention control that applies a yaw moment for avoiding the departure of the vehicle, when a traveling lane departure tendency of the vehicle has been detected or a lane maintenance control that applies a yaw moment to the vehicle so that the vehicle will travel in the vicinity of the center of the traveling lane are known as those that control the lateral movement of the vehicle. However, a lane departure prevention control is a control having a control intervention threshold, and the control is not actuated in the vicinity of the center of the traveling lane; therefore, the safety of the vehicle with respect to disturbance cannot be secured. Also, since a control intervention takes place due to the threshold value even if the driver wants to pull the vehicle to the edge of the traveling lane, the driver will experience some difficulty. On the other hand, a lane maintenance control is a control having a target position (a target line), so that, while the safety of the vehicle with respect to disturbance can be secured, causing the vehicle to travel along a line that deviates from the target line is not possible. In addition, since the control will be released when the gripping force of the driver on the steering wheel is reduced due to a determination that a hands-off state exists, the driver will have to constantly grip the steering wheel at a force above a certain level; as a result, there is a large steering load on the driver. In contrast, the yaw angle F/B control of the first embodiment does not have a control intervention threshold; therefore, always securing safety with respect to disturbance with a seamless control is possible. Also, since the above does not have a target position, the driver is able to drive the vehicle in a desired line. Additionally, control will not be released even if the steering wheel 6 is lightly held, allowing for a reduction in the steering load of the driver.

Figure 9:
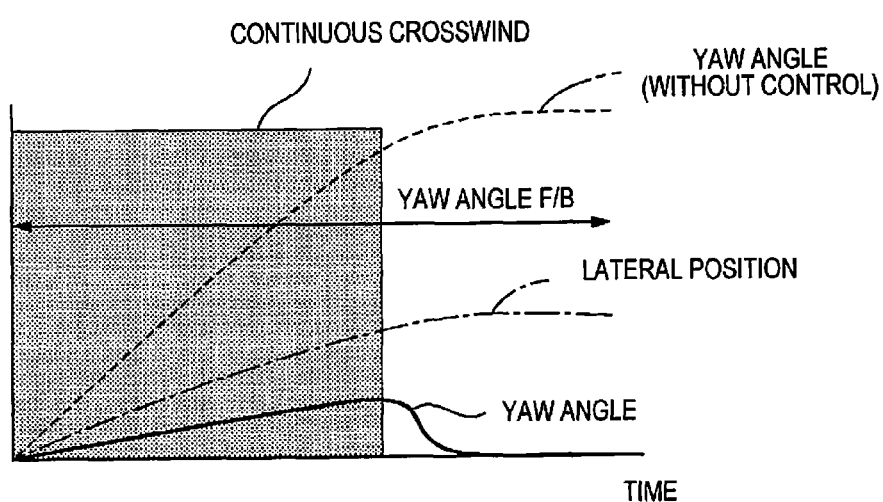
FIG. 9 is a time chart illustrating the yaw angle change and the lateral position change when the lateral position F/B control is not executed when a vehicle traveling on a straight road of a highway receives a continuous crosswind.

FIG. 9 is a time chart illustrating the yaw angle change and the lateral position change when the lateral position F/B control is not executed when a vehicle traveling on a straight road of a highway receives a continuous crosswind, and the vehicle is assumed to be traveling in the vicinity of the center of the traveling lane. When a vehicle receives a continuous crosswind and a yaw angle is generated, the yaw angle will be reduced due to the yaw angle F/B control, but the vehicle will still be receiving continuous crosswind and will be drifting. This is because the yaw angle F/B control is for reducing the yaw angle and will not correct the turning angle when the yaw angle is zero; therefore, directly reducing the lateral position change, which is the integrated value of the yaw angles that are generated due to disturbance, is not possible. Indirectly suppressing the lateral position change (suppressing an increase in the integrated value of the yaw angles) is possible by making the repulsive force corresponding to the yaw angle a large value; however, since the maximum value of the external disturbance suppression command turning angle is limited to 0.2° to the left and right so as not to impart discomfort to the driver, effectively suppressing the drifting of the vehicle only with yaw angle F/B control is difficult. Additionally, the yaw angle F/B gain for determining the repulsive force corresponding to the yaw angle is made to be as large a value as possible because converging the yaw angle before the driver notices the yaw angle change is necessary; however, since the vehicle will vibrate if this remains that way, the yaw angle that is multiplied by the yaw angle F/B gain is limited to equal to or less than the upper limit (1°) by the upper and lower limiter 37a. In other words, since the repulsive force corresponding to the yaw angle is a repulsive force corresponding to a yaw angle that is less than the actual yaw angle, this point also demonstrates that effectively suppressing the drifting of the vehicle only with yaw angle F/B control is difficult.

Figure 10:
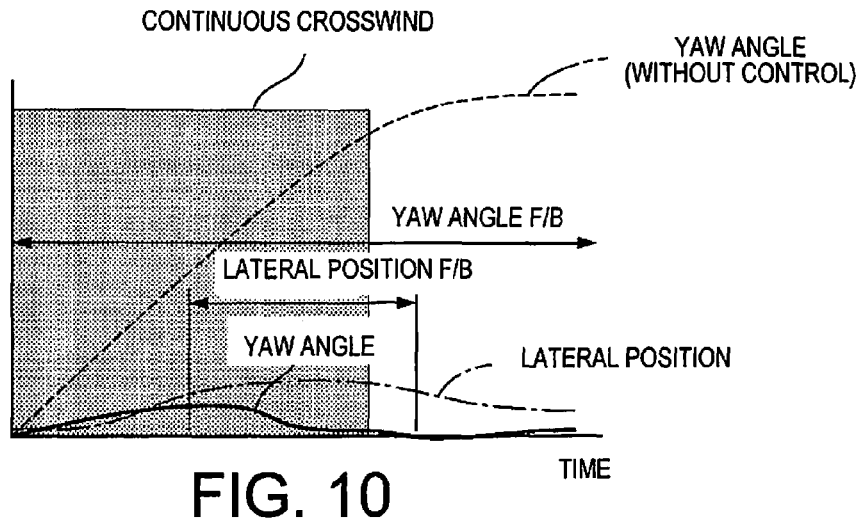
FIG. 10 is a time chart illustrating the yaw angle change and the lateral position change when the lateral position F/B control is executed when a vehicle traveling on a straight road of a highway receives a continuous crosswind.

Therefore, in the stability control of the first embodiment, a lateral position F/B control is introduced to suppress the vehicle from drifting by a steady disturbance. FIG. 10 is a time chart illustrating the yaw angle change and the lateral position change when the lateral position F/B control is executed when a vehicle traveling on a straight road of a highway receives a continuous crosswind, and in the lateral position F/B control; when a vehicle traveling in the vicinity of the center of the traveling lane receives a continuous crosswind and drifts and the distance to the white line becomes equal to or less than a lateral position threshold, a repulsive force corresponding to the lateral position change (≈yaw angle integrated value) is calculated. In the external disturbance suppression command turning angle calculation unit 32, an external disturbance suppression command turning angle based on the lateral repulsive force, which adds the repulsive force corresponding to the lateral position and the repulsive force corresponding to the yaw angle, is calculated, and the SBW command turning angle is corrected. That is, in the lateral position F/B control, the SBW command turning angle is corrected by an external disturbance suppression command turning angle corresponding to the lateral position; as a result, directly reducing the lateral position change caused by a steady disturbance is possible, and the drifting of the vehicle can be suppressed. In other words, returning the traveling position of a vehicle conducting a yaw angle F/B control to the vicinity of the center of the traveling lane, which is a dead zone for the lateral position F/B control, is possible.

As described above, the stability control of the first embodiment reduces the yaw angle change due to a transient disturbance with the yaw angle FIB control and reduces the yaw angle integrated value (the lateral position change) due to a steady disturbance with the lateral position F/B control; as a result, the stability control is capable of enhancing the safety of the vehicle against both transient and steady disturbances. Furthermore, the stability control of the first embodiment limits the vehicle behavior that is generated by the control (the application of the external disturbance suppression command turning angle) to a level that is not noticed by the driver and a level that will not interfere with the vehicle behavior change that is generated by the steering of the driver; this does not reflect the change in the self-aligning torque generated by the control of the steering reaction force and, thus, can be executed without the driver being aware that stability control is taking place. As a result, simulating the behavior of a vehicle in order to have a vehicle body specification with excellent stability against disturbance is possible. The lateral position F/B gain for determining the repulsive force corresponding to the lateral position in the lateral position F/B control is set to a value less than the yaw angle F/B gain. As described above, the yaw angle F/B control must be responsive due to the necessity of converging the yaw angle before the driver feels a change in the yaw angle caused by a transient disturbance, whereas the lateral position F/B control does not require as much responsiveness as the yaw angle F/B control, because stopping the increase in the lateral position change is required and the lateral position takes time to change due to the accumulation of the yaw angle integrated value. In addition, this is because, if the lateral position F/B gain were to be increased, the control amount will change greatly according to the magnitude of the disturbance, and discomfort will be imparted on the driver.

Lateral Force Offset Unit

Figure 11:
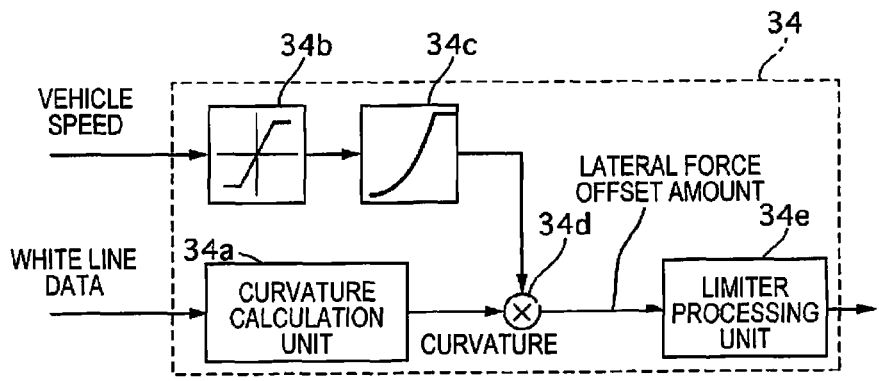
FIG. 11 is a control block view of a lateral force offset unit 34.

FIG. 11 is a control block view of a lateral force offset unit 34. A curvature calculation unit 34a (a curvature detection unit) calculates the curvature of the white line at the forward fixation point. An upper and lower limiter 34b executes an upper and lower limiter operation on the vehicle speed. A SAT gain calculating unit 34c calculates an SAT gain corresponding to the vehicle speed based on the vehicle speed after the limiter operation. The SAT gains shall have a characteristic of becoming a larger gain as the vehicle speed increases, and an upper limit is set thereon. The multiplier 34d determines the lateral force offset amount by multiplying the curvature and the SAT gain. A limiter processing unit 34e limits the maximum value and the upper limit of the change rate of the lateral force offset amount. For example, the maximum value is 1,000N, and the upper limit of the change rate is 600 N/s. Limiting the lateral force offset amount in the limiter processing unit 34e will be described in detail below.

Effect of the reaction force offset control corresponding to the curvature

Figure 12:
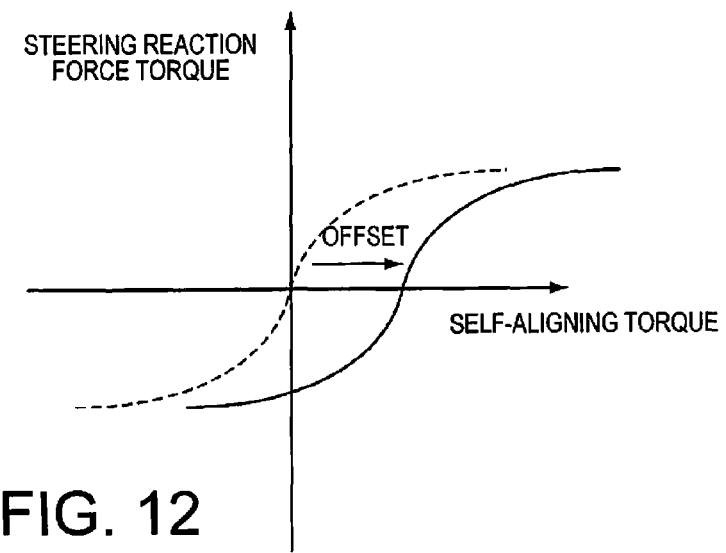
FIG. 12 is a view illustrating a state in which a steering reaction force characteristic, representing the steering reaction force torque corresponding to a self-aligning torque, is offset in the same direction as the self-aligning torque.

The reaction force offset control corresponding to the curvature determines a larger lateral force offset amount as the curvature of the white line increases, which is subtracted from the tire lateral force. The steering reaction force torque corresponding to the tire lateral force that is calculated by the SAT calculation unit 35, that is, the steering reaction force characteristic representing the steering reaction force torque corresponding to the self-aligning torque is thereby offset in a direction corresponding to a sign of the self-aligning torque, as the curvature of the white line increases, as illustrated in FIG. 12. FIG. 12 illustrates a case of a right curve, and in the case of a left curve, the offset is in the opposite direction of FIG. 12.

Figure 13:
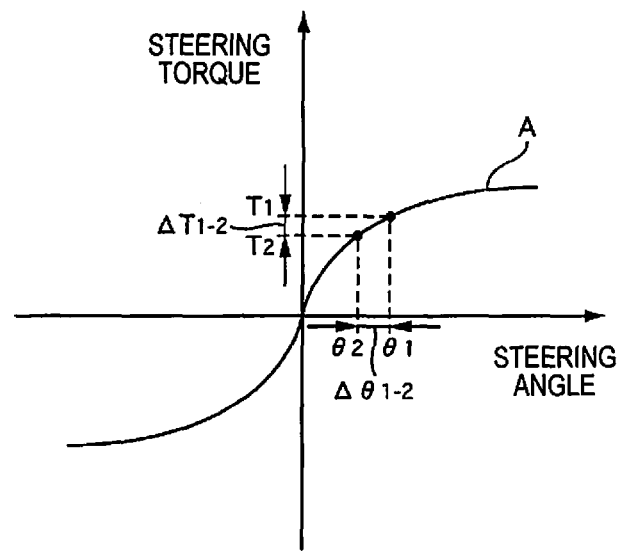
FIG. 13 is a characteristic view illustrating the relationship between the steering angle of the steering wheel and the steering torque of the driver.

Conventionally, in an SBW system in which the steering unit and the turning unit are mechanically separated, a steering reaction force characteristic that simulates a steering reaction force corresponding to the self-aligning torque in a conventional steering device is set, and the steering reaction force is applied to the steering wheel based on the steering reaction force characteristic; at this time, the relationship between the steering angle of the steering wheel and the turning torque of the driver has the characteristic A illustrated in FIG. 13. That is, the absolute value of the turning torque increases as the absolute value of the steering angle increases, and the change amount of the turning torque with respect to the change amount of the steering angle increases when the absolute value of the steering angle is small, as compared to when large.

Here, a case is considered in which the driver changes the steering retention torque to adjust the course during turning. In FIG. 13, when the driver reduces the steering retention torque to $T_2$ from a state in which the steering angle $\theta_1$ is retained with a steering retention torque $T_1$, the steering angle becomes $\theta_2$, and the turning angle of the front wheels 5L, 5R decreases due to the decrease in the steering angle. At this time, due to the steering reaction force characteristic in the SBW system described above, the steering angle varies greater with respect to the change in the steering reaction force torque as the curvature of the curve increases. In other words, the sensitivity of the vehicle with respect to the steering torque increases as the curvature of the curve increases; as a result, there is a problem that adjusting the course is difficult.

Figure 14:
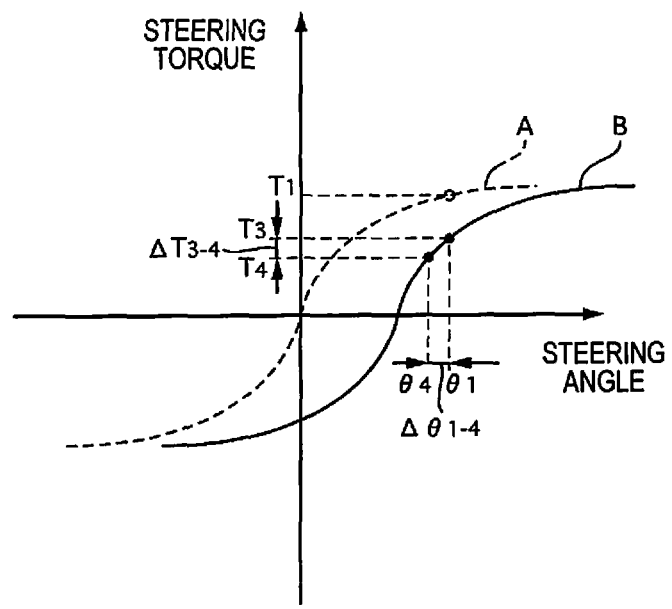
FIG. 14 is a view illustrating a state in which a characteristic illustrating the relationship between the steering angle of the steering wheel and the steering torque of the driver has been changed by offsetting the steering reaction force characteristic, representing the steering reaction force torque corresponding to the self-aligning torque, in the same direction as the self-aligning torque.

In contrast, in the reaction force offset control corresponding to the curvature of the first embodiment, by offsetting the steering reaction force characteristic, which represents the steering reaction force torque corresponding to the self-aligning torque, more in the same direction as the self-aligning torque, the characteristic representing the relationship between the steering angle and the steering torque is offset in a direction corresponding to a sign of the steering angle, as illustrated in FIG. 14, and characteristic A changes to characteristic B. The change amount of the steering angle with respect to the change amount of the steering retention torque thereby decreases as the curvature of the white line increases; even when the driver reduces the steering retention torque to $T_4$ and the reduction amount of the steering retention torque $\Delta T_{3-4}$ is the same as the reduction amount of the prior art $\Delta T_{1-2}$ illustrated in FIG. 13, the reduction amount of the steering angle $\Delta\theta_{1-4}$ will become smaller than the reduction amount of the prior art $\Delta\theta_{1-2}$. That is, variation in the steering angle with respect to the change in the steering retention torque can be made smaller as the curvature of the curve increases, and the sensitivity of the vehicle with respect to the steering torque can be reduced; as a result, behavior change in the vehicle becomes gradual, and facilitating the adjustment of the course by the driver is possible. Additionally, since the steering retention torque $T_3$ ($<T_1$) for maintaining the steering angle $\theta_1$ can be made to be smaller than that of the prior art, the steering load of the driver while turning can be reduced.

Conventionally, technology that aims to reduce the steering load of the driver while turning, which reduces the slope of the steering reaction force characteristic more as the curvature of the white line increases, is known; however, in the conventional technology, variability in the steering angle with respect to the change in the steering retention torque increases as the curvature increases, so the sensitivity of the vehicle with respect to the steering torque increases. That is, realizing a reduction in the steering load of the driver during turning and facilitating the adjustment of the course are possible by offsetting the steering reaction force characteristic in the same direction as the self-aligning torque in accordance with the curvature of the white line.

Steering Reaction Force Torque Offset Unit

Figure 15:
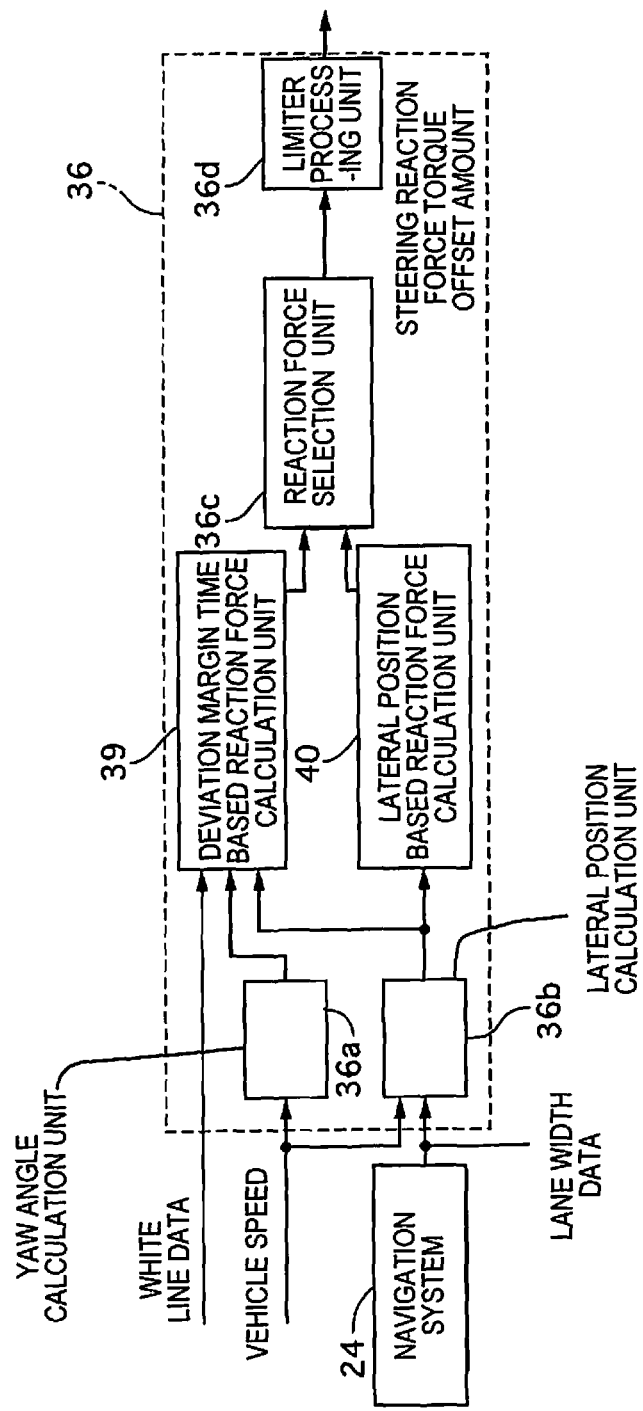
FIG. 15 is a control block view of a steering reaction force torque offset unit 36.

FIG. 15 is a control block view of a steering reaction force torque offset unit 36. A yaw angle calculation unit 36a calculates the yaw angle at the forward fixation point. Easily and precisely detecting the yaw angle is possible by calculating the yaw angle based on an image of the traveling path captured by the camera 17. A lateral position calculation unit 36b calculates each of the lateral position with respect to the left and right white lines at the forward fixation point and the lateral position with respect to the left and right white lines at the current position. Here, when the host vehicle moves to an adjacent traveling lane beyond the white line, that is, when a lane change occurs, the lateral position calculation unit 36b replaces the lateral position with respect to the left and right white lines at the current position. That is, the lateral position with respect to the left white line before reaching the white line is set as the lateral position with respect to the right white line after reaching the white line, and the lateral position with respect to the right white line before reaching the white line is set as the lateral position with respect to the left white line after reaching the white line. When changing lanes to a traveling lane that has a different lane width, the lateral position is corrected by multiplying the value $W_2/W_1$, obtained by dividing the lane width $W_2$ of the traveling lane after the lane change by the lane width $W_1$ of the traveling lane before the lane change, by the replaced lateral position. Here, the lane width information of each traveling lane is acquired from a navigation system 24. A reaction force calculation unit 39 corresponding to the deviation margin time calculates a reaction force corresponding to the deviation margin time based on the vehicle speed and the lateral position with respect to the left and right white lines at the forward fixation point. The details of the reaction force calculation unit 39 corresponding to the deviation margin time will be described below. A reaction force calculation unit 40 corresponding to the lateral position calculates the reaction force corresponding to the lateral position, based on the lateral position with respect to the left and right white lines at the current position. The details of the reaction force calculation unit 40 corresponding to the lateral position will be described below. A reaction force selection unit 36c selects that with the larger absolute value from among the reaction force corresponding to the deviation margin time and the reaction force corresponding to the lateral position as the steering reaction force torque offset amount. A limiter processing unit 36d limits the maximum value and the upper limit of the change rate of the steering reaction force torque offset amount. For example, the maximum value is 2 Nm, and the upper limit of the change rate is 10 Nm/s.

Figure 16:
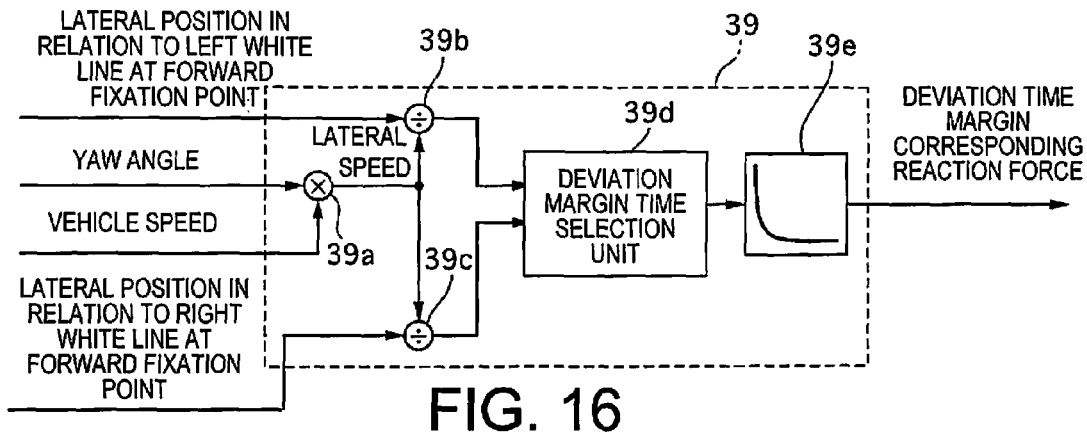
FIG. 16 is a control block view of a reaction force calculation unit 39 corresponding to the deviation margin time.

FIG. 16 is a control block view of a reaction force calculation unit 39 corresponding to the deviation margin time. A multiplier 39a determines the lateral speed of the vehicle by multiplying the vehicle speed and the yaw angle. A divider 39b determines the deviation margin time with respect to the left white line by dividing the lateral position with respect to the left white line at the forward fixation point by the lateral speed. A divider 39c determines the deviation margin time with respect to the right white line by dividing the lateral position with respect to the right white line at the forward fixation point by the lateral speed. A deviation margin time selection unit 39d selects the shorter of the deviation margin times with respect to the left and right white lines as the deviation margin time. A reaction force calculation unit 39e corresponding to the deviation margin time calculates the reaction force corresponding to the deviation margin time, based on the deviation margin time. The reaction force corresponding to the deviation margin time is inversely proportional to the deviation margin time (proportional to the inverse of the deviation margin time) and has the characteristic of becoming almost zero at three seconds or more.

Figure 17:
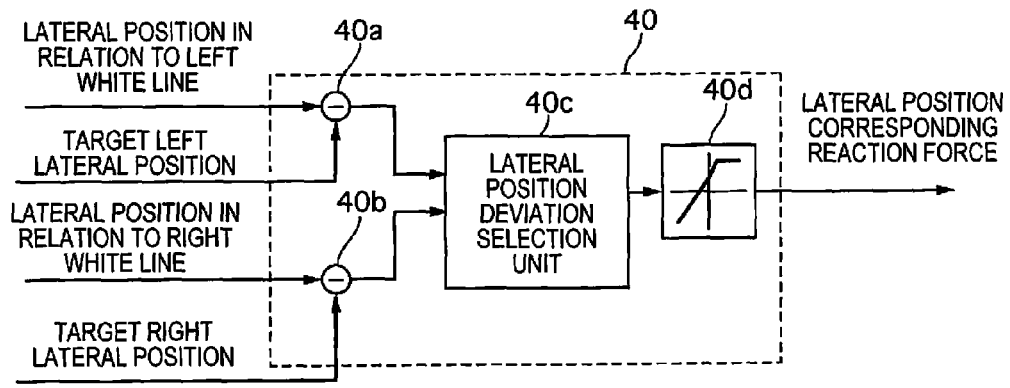
FIG. 17 is a control block view of a reaction force calculation unit 40 corresponding to the lateral position.

FIG. 17 is a control block view of a reaction force calculation unit 40 corresponding to the lateral position. The subtracter 40a determines the lateral position deviation with respect to the left lane by subtracting the lateral position with respect to the left lane from a target left lateral position that is set beforehand (for example, 90 cm). A subtracter 40b determines the lateral position deviation with respect to the right lane by subtracting the lateral position with respect to the right lane from a target right lateral position that is set beforehand (for example, 90 cm). A lateral position deviation selection unit 40c selects the larger of the lateral position deviations with respect to the left and right lanes as the lateral position deviation. A reaction force calculation unit 40d corresponding to the lateral position deviation calculates the reaction force corresponding to the lateral position, based on the lateral position deviation. The reaction force corresponding to the lateral position is set to have a characteristic of increasing as the lateral position deviation increases, and an upper limit is set thereon.

Figure 18:
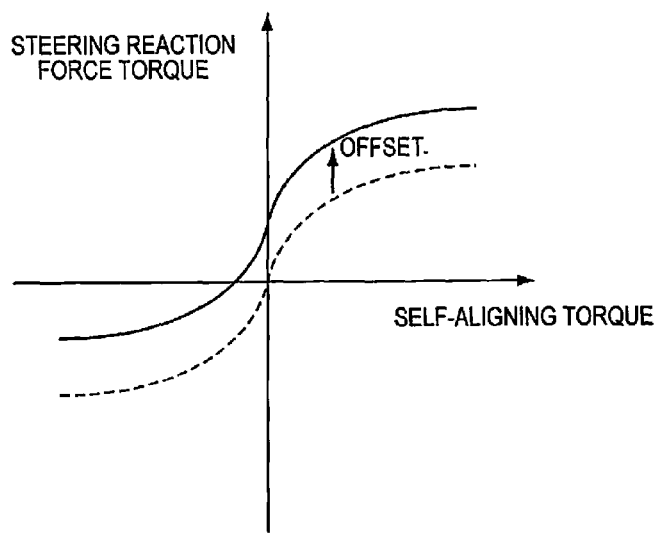
FIG. 18 is a view illustrating a state in which the steering reaction force characteristic, representing the steering reaction force torque corresponding to the self-aligning torque, is offset in a direction in which the absolute value of the steering reaction force torque becomes larger.

Effect of the Reaction Force Offset Control Corresponding to the Lateral Position The reaction force offset control corresponding to the lateral position adds the reaction force corresponding to the lateral position to the steering reaction force torque to determine the steering reaction force torque offset amount. The steering reaction force characteristic representing the steering reaction force torque corresponding to the self-aligning torque is thereby offset in a direction in which the absolute value of the steering reaction force torque increases as the distance to the white line decreases, as illustrated in FIG. 18. FIG. 18 illustrates a case of being close to the right lane, and in the case of being close to the left lane, the offset is in the opposite direction of that shown in FIG. 18.

Figure 19:
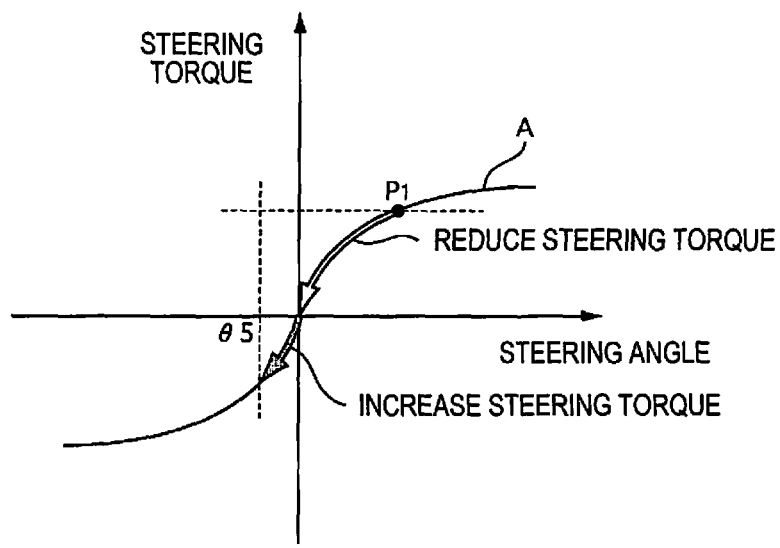
FIG. 19 is a characteristic view illustrating the relationship between the steering angle of the steering wheel and the steering torque of the driver.

Here, a case is considered in which the traveling position of the vehicle shifts to the right side due to the driver suddenly steering to the right, after which the driver returns the traveling position to the vicinity of the center of the traveling lane with corrective steering, in a conventional steering reaction force control. The steering angle and the steering torque when the driver conducts a sudden operation shall be the position of point $P_1$ on the characteristic A in FIG. 19. The characteristic A shall be a characteristic representing the relationship between the steering angle and the steering torque when setting a steering reaction force characteristic simulating a conventional steering device, in the same manner as FIG. 13. Since turning the front wheel is necessary in order to return the traveling position to the vicinity of the center of the traveling lane from this state, following the increased steering to the steering angle neutral position, the driver increases the steering from the steering angle neutral position and matches the steering wheel to a target angle $\theta_5$. At this time, in the conventional technology described above, the steering angle neutral position (the steering angle zero point) and the steering torque neutral position (the steering torque zero point) match, and decreasing the steering torque until the steering angle neutral position while increasing the steering torque after exceeding the steering angle neutral position is necessary. In other words, when conducting corrective steering straddling the steering angle neutral position, the sign of the steering torque is inverted, and the direction in which the driver controls the force is switched; since the change amount of the steering angle with respect to the change amount of the steering torque is significantly smaller in the vicinity of the steering torque neutral position, as compared to other steering angle regions, the steering load on the driver is large, and controlling the steering wheel to be at the target angle $\theta_5$ is difficult. Thus, there is the problem that the traveling position of the vehicle is more readily overshot, leading to an increase in the corrective steering amount.

Figure 20:
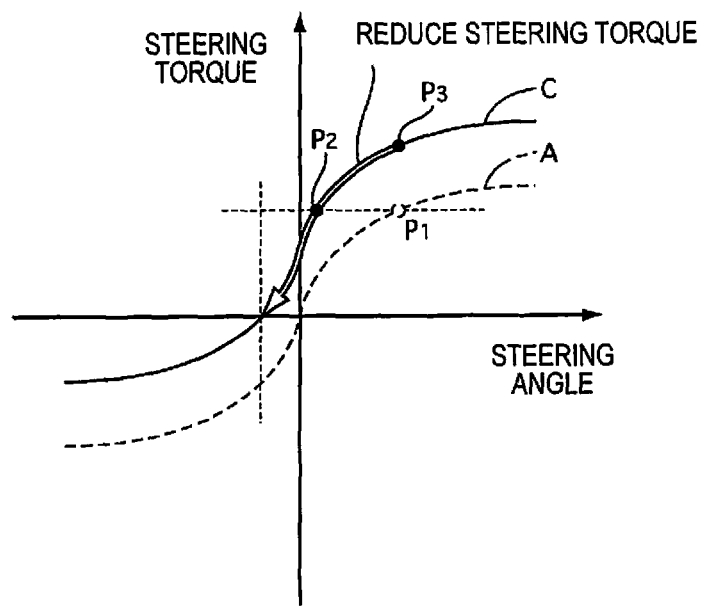
FIG. 20 is a view illustrating a state in which the characteristic illustrating the relationship between the steering angle of the steering wheel and the steering torque of the driver has been changed by offsetting the steering reaction force characteristic, representing the steering reaction force torque corresponding to the self-aligning torque, in a direction in which the absolute value of the steering reaction force torque becomes larger.

In contrast, in the reaction force offset control corresponding to the lateral position of the first embodiment, by offsetting the steering reaction force torque corresponding to the self-aligning torque more in a direction in which the absolute value of the steering reaction force torque increases as the distance to the white line decreases, the characteristic representing the relationship between the steering angle and the turning torque is offset in the direction in which the absolute value of the steering torque increases, as illustrated in FIG. 20, and characteristic A changes continuously to characteristic C, as the distance to the white line decreases. At this time, increasing the steering torque is necessary in order to maintain the steering angle; therefore, if the steering torque is constant, the steering wheel 6 gradually returns to the steering angle neutral position (point $P_1 \rightarrow$ point $P_2$), thereby suppressing the traveling position of the vehicle from shifting to the right side due to the driver suddenly increasing the steering. On the other hand, when the driver maintains the steering angle, the steering angle and the steering torque move from point $P_1$ to point $P_3$. When the driver conducts corrective steering from this state, since the steering torque neutral position is offset more to the steering increase side than the steering angle neutral position in characteristic C, the sign of the steering torque is not inverted before reaching the steering torque neutral position when the steering increases from the steering angle neutral position. Thus, the driver is able to control the turning angle of the front wheels 5L, 5R by only reducing the steering torque and stopping the rotation of the steering wheel 6 when the steering wheel 6 is turned to the target angle. That is, the reaction force offset control corresponding to the lateral position of the first embodiment is able to facilitate the corrective steering of the driver since the direction in which the driver controls the force is not readily switched. As a result, the traveling position of the vehicle is not readily overshot, and the corrective steering amount can be reduced.

Conventionally, a technology is known in which the object is to prevent the traveling position from shifting due to the driver suddenly increasing the steering reaction force when approaching the white line; however, in the conventional technology, the steering wheel is simply made to be more difficult when approaching the white line, and the steering torque neutral position in the steering reaction force characteristic always matches with the steering angle neutral position; therefore, the sign of the steering torque is inverted in corrective steering that straddles the steering angle neutral position, and the steering load of the driver is not reduced. In other words, by offsetting the steering reaction force torque corresponding to the self-aligning torque more in a direction in which the absolute value of the steering reaction force torque increases as the distance to the white line decreases, realizing both the suppression of the shifting of the traveling position and a reduction in the steering load of the driver is possible.

Additionally, in the reaction force offset control corresponding to the lateral position of the first embodiment, the offset amount is configured to be greater as the distance to the white line decreases; as a result, the steering torque neutral position is offset to a position that is further separated from the steering angle neutral position as the distance to the white line decreases. When the driver conducts corrective steering to return the traveling position of the vehicle to the vicinity of the center of the traveling lane, increasing the steering increase operation amount from the steering angle neutral position as the white line comes closer is necessary. At this time, when the offset amount of the steering torque neutral position with respect to the steering angle neutral position is small, there is the possibility that the steering torque surpasses the neutral position and the sign of the steering torque is inverted before the steering wheel turns to the target angle. Thus, suppressing the steering torque from surpassing the neutral position is possible by increasing the offset amount as the distance to the white line decreases.

In the reaction force offset control corresponding to the lateral position of the first embodiment, the lateral position calculation unit 36b switches the lateral position with respect to the left and right white lines at the current position when the host vehicle reaches the white line. The reaction force offset control corresponding to the lateral position is configured so that the host vehicle readily returns to the vicinity of the center of the traveling lane by increasing the steering reaction force as the host vehicle gets farther away from the vicinity of the center of the traveling lane. In other words, the yaw angle integrated value (the lateral position change) is considered to be a disturbance, and the steering reaction force is controlled so that the vehicle is guided in a direction in which the yaw angle integrated value is eliminated. Consequently, resetting the yaw angle integrated value when a lane change has been conducted is necessary. This is because, if the yaw angle integrated value is not reset, the steering reaction force for returning the vehicle to the vicinity of the center of the traveling lane before the lane change will continue to act even after the lane change, and the operation of the driver will be inhibited. If the integrated value is simply set to be zero, guiding the vehicle to the vicinity of the center of the traveling lane after the lane change will not be possible.

Therefore, in the first embodiment, since a deliberate operation of the driver can be considered when the host vehicle reaches the white line, in that case, by switching the lateral position with respect to the left and right white lines at the current position, in other words, by inverting the sign of the yaw angle integrated value, the position to which the host vehicle is guided is switched from the vicinity of the center of the traveling lane before the lane change to the vicinity of the center of the traveling lane after the lane change; therefore, a steering reaction force for guiding the host vehicle to the vicinity of the center of the traveling lane after the lane change can be generated. At this time, in order to consider the ratio $W_2/W_1$ of the lane width $W_2$ of the traveling lane after the lane change with respect to the lane width $W_1$ of the traveling lane before the lane change, setting an accurate lateral position is possible, and setting an optimum offset amount for guiding the host vehicle to the vicinity of the center of the traveling lane is possible.

Effect of the Reaction Force Offset Control Corresponding to the Deviation Margin Time The reaction force offset control corresponding to the deviation margin time adds the reaction force corresponding to the deviation margin time to the steering reaction force torque to determine the steering reaction force torque offset amount. The steering reaction force characteristic representing the steering reaction force torque corresponding to the self-aligning torque is thereby offset in a direction in which the absolute value of the steering reaction force torque increases as deviation margin time decreases, as illustrated in FIG. 18. FIG. 18 illustrates a case of being close to the right lane, and in the case of being close to the left lane, the offset is in the opposite direction of FIG. 18.

Accordingly, the characteristic representing the relationship between the steering angle and the steering torque is offset in a direction in which the absolute value of the steering torque increases, and characteristic A changes continuously to characteristic C, as the deviation margin time decreases, as illustrated in FIG. 20. At this time, increasing the steering torque in order to maintain the steering angle is necessary; therefore, if the steering torque is constant, the steering wheel 6 gradually returns to the steering angle neutral position (point $P_1 \rightarrow$ point $P_2$), thereby suppressing the traveling position of the vehicle from shifting to the right side due the driver suddenly steering. On the other hand, when the driver maintains the steering angle, the steering angle and the steering torque moves from point $P_1$ to point $P_3$. When the driver conducts corrective steering from this state, since the steering torque neutral position is offset more to the steering increase side than the steering angle neutral position in characteristic C, the sign of the steering torque is not inverted before reaching the steering torque neutral position when the steering increases operation from the steering angle neutral position. Thus, the driver is able to control the turning angle of the front wheels 5L, 5R by only reducing the steering torque and stopping the rotation of the steering wheel 6 when the steering wheel 6 is turned to the target angle. That is, the reaction force offset control corresponding to the deviation margin time of the first embodiment is able to facilitate the corrective steering of the driver since the direction in which the driver controls the force is not readily switched. As a result, the traveling position of the vehicle is not readily overshot, and the corrective steering amount can be reduced.

Additionally, in the reaction force offset control corresponding to the deviation margin time of the first embodiment, the offset amount is configured to increase as the deviation margin time decreases; as a result, the steering torque neutral position is offset to a position that is further separated from the steering angle neutral position as the deviation margin time decreases. When the driver conducts corrective steering for returning the traveling position of the vehicle to the vicinity of the center of the traveling lane, the vehicle is more likely to be closer to the white line as the deviation margin time decrease, and increasing the amount of steering from the steering angle neutral position as the white line becomes closer is necessary. At this time, when the offset amount of the steering torque neutral position with respect to the steering angle neutral position is small, there is the possibility that the steering torque surpasses the neutral position and the sign of the steering torque is inverted before the steering wheel is turned to the target angle. Thus, suppressing the steering torque from surpassing the neutral position is possible by increasing the offset amount as the distance to the white line decreases.

Effect of the Reaction Force Offset Control Corresponding to the Lateral Position and the Deviation Margin Time In the steering reaction force control unit 20, that with the larger absolute value from among the reaction force corresponding to the deviation margin time and the reaction force corresponding to the lateral position is selected as the steering reaction force torque offset amount in the steering torque offset unit 36, and the steering reaction force torque offset amount is added to the steering reaction force torque in the adder 20c. The steering reaction force characteristic is thereby offset in a direction in which the absolute value of the steering reaction force torque increases in accordance with the deviation margin time or the lateral position. In the reaction force offset control corresponding to the deviation margin time, the reaction force corresponding to the deviation margin time is zero when the host vehicle and the white line are parallel, that is, when the yaw angle is zero. Consequently, even if the host vehicle is in a position close to the white line, when the yaw angle is small, only a small reaction force can be output. In contrast, in the reaction force offset control corresponding to the lateral position, a reaction force (a reaction force corresponding to the lateral position) is generated to be proportionate to the distance to the white line; therefore, a larger reaction force can be output as the distance to the white line decreases, and readily returning the host vehicle to the vicinity of the center of the traveling lane is possible.

On the other hand, in the reaction force offset control corresponding to the lateral position, when the host vehicle is in the vicinity of the center of the traveling lane, the reaction force corresponding to the lateral position is zero. Consequently, even in the vicinity of the center of the traveling lane, when the yaw angle is large and the vehicle speed is high, the white line is reached in a short period of time while increasing the steering reaction force with good responsiveness is difficult. In contrast, in the reaction force offset control corresponding to the deviation margin time, since a reaction force (a reaction force corresponding to the deviation margin time) is generated in accordance with the deviation margin time, and the reaction force has the characteristic of rapidly increasing when the deviation margin time becomes equal to or less than 3 seconds, and suppressing lane departure by increasing the steering reaction force is possible even when reaching the white line in a short period of time. Thus, by combining the reaction force offset control corresponding to the deviation margin time and the reaction force offset control corresponding to the lateral position, effectively suppressing lane departure while applying a stable reaction force in accordance with the distance to the white line is possible. At this time, by using that with the larger absolute value from among the reaction force corresponding to the deviation margin time and the reaction force corresponding to the lateral position, always applying the optimum required steering reaction force is possible.

Regarding the Limiter Operation of the Lateral Force Offset Unit

Figure 21:
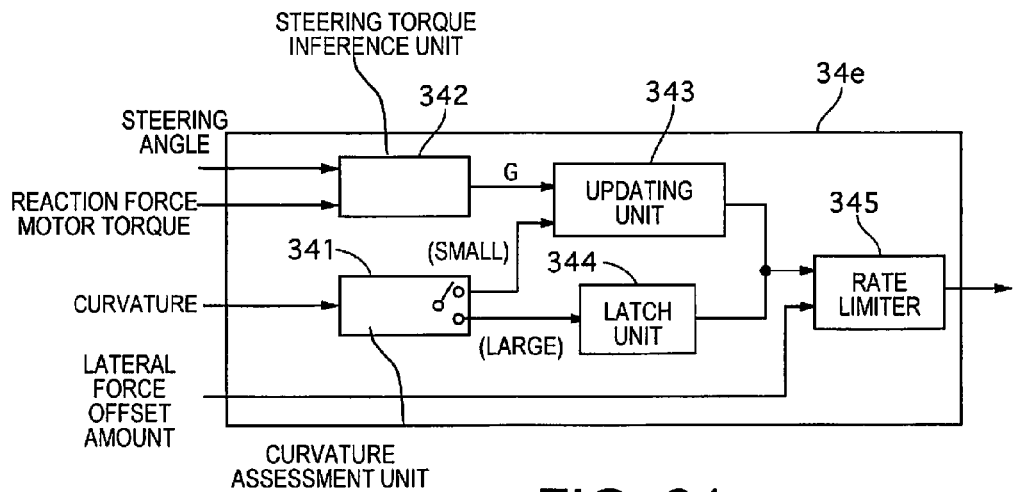
FIG. 21 is a block view representing a control configuration inside of a limiter processing unit in a lateral force offset unit of the first embodiment.

Next, the details of the limiter processing unit 34e in the lateral force offset unit 34 will be described. FIG. 21 is a block view representing a control configuration inside of a limiter processing unit in a lateral force offset unit of the first embodiment. The limiter processing unit 34e assesses whether the curvature is a predetermined curvature that is set in advance or greater; this unit comprises a curvature assessment unit 341 that selects a straight traveling time gain setting unit 344 and outputs a rate limiter gain k when less than the predetermined curvature (on a road that is nearly straight or that is configured by very slight curves) and selects a curve time gain setting unit 343 and outputs a rate limiter gain k when equal to or greater than the predetermined curvature (on a curved road). The steering torque with respect to the turning direction of the driver based on the steering angle and the reaction force motor torque is inferred by a steering torque inference unit 342. The inferred steering torque is outputted to the curve time gain setting unit 343.

Figure 22:
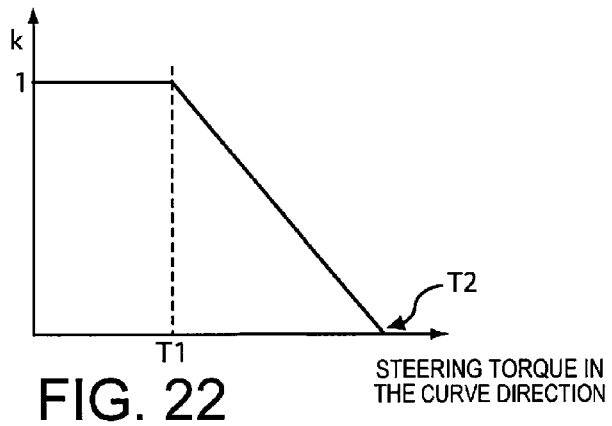
FIG. 22 is a map for calculating a rate limiter gain k in a lateral force offset unit of the first embodiment when traveling along a curve.

The straight traveling time gain setting unit 344 sets 1 as the rate limiter gain k, which is output to a rate limiter 345. The curve time gain setting unit 343 sets the rate limiter gain k based on the steering torque in the curve direction, which is output to the rate limiter 345. FIG. 22 is a map for calculating a rate limiter gain k in a lateral force offset unit of the first embodiment when traveling along a curve. As illustrated in this map, when the steering torque in the curve direction is equal to or greater than a first predetermined value T1, k=1, which is the normal time rate limiter gain, is set, and this is changed to be a smaller rate limiter gain as the steering torque in the curve direction increases. The rate limiter 345 sets a rate limiter by multiplying the calculated rate limiter gain k and a rate limiter reference value, which limits the change rate of the lateral force offset amount to the increasing side and the decreasing side, and outputs the lateral force offset amount, which is limited with the rate limiter.

Figure 23:
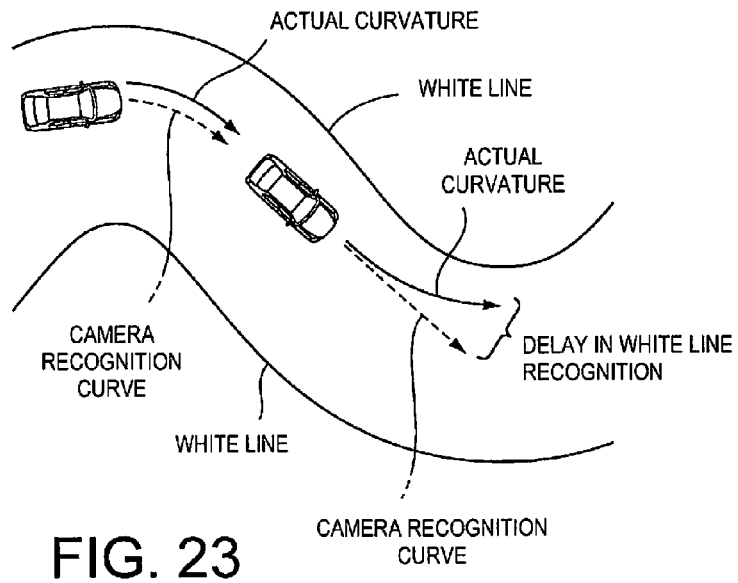
FIG. 23 is a schematic view representing a state when a vehicle with a steering control device of the first embodiment continues to travel along a curve having a relatively large curvature.

Next, the effects will be described. FIG. 23 is a schematic view representing a state when a curve having a relatively large curvature continues, in a steering control device of the first embodiment. As in the first embodiment, in a system that assists steering using white line data obtained from a captured image of a camera 17, there are scenes in which, in the case of a scene in which a curve with a relatively large curvature continues or a state of high-speed traveling, the white line data cannot catch up with the changes in the road surface. In this case, the driver steers by visually recognizing the road shape; since this driver recognition is faster than the recognition by the camera 17, there are cases in which assisting by camera recognition becomes difficult with respect to an operation based on the driver recognition.

As illustrated in FIG. 23, for example, there may be a scene in which driver recognition and camera recognition match to a certain degree, and an appropriate steering assist can be executed on the first curve; however, for the next curve, if camera recognition is delayed, only a curvature that is smaller than the actual curvature can be recognized. At this time, in a state in which the driver has already started steering or is maintaining steering in the curve direction without assisted control, recognition by the camera 17 catches up later, and the steering assist will intervene based on the recognition. Therefore, there is the risk that discomfort is imparted due to pressure, etc., being changed by the delayed control intervention, even though the driver is steering based on self-recognition. This is because, for example, in a state in which a steering force is applied when entering a curve, discomfort is imparted to the driver if the steering force suddenly becomes lighter.

This is mainly when traveling a curved road when these deviations occur between the recognition of the driver and the recognition of the camera 17, and avoiding control from intervening is especially preferable when in a state in which the driver is applying a steering torque in the curve direction. Thus, in the first embodiment, a steering torque in the curve direction is detected, and the steering torque being equal to or greater than a predetermined value T1 means that the driver is traveling on a curved road based on the steering operation; at this time, suppressing a change in the steering force due to an increase in the lateral force offset amount is avoided. Specifically, the discomfort described above is eliminated by suppressing a change in the lateral force offset amount to the increasing side and the decreasing side by setting the rate limiter gain k to gradually decrease according to the magnitude of the steering torque in the curve direction.

As illustrated in FIG. 22, when the steering torque becomes larger than a second predetermined value T2, the rate limiter gain k is set to 0, and a change in the lateral force offset amount is inhibited. This is because, if the steering force is changed while steering in a state in which the driver is operating the steering wheel 6 and is applying a steering torque that should be recognized as "having operated the wheel," discomfort is imparted to the driver, rather than the steering feeling being improved due to the steering assist. A stable steering state can thereby be realized by the steering torque from the driver even if the recognition by the camera 17 is delayed in a scene in which relatively small curves continue.

The effects listed below can be obtained with the first embodiment, as described above.

(1) The present invention comprises a steering unit 1 that receives steering input from a driver and is mechanically separated from a turning unit 2 that turns a left and a right front wheel (5FL, 5FR) (the turnable wheels); a steering reaction force control unit 20 that sets a steering reaction force characteristic to coordinates, of which the coordinate axes are the self-aligning torque and the steering reaction force, so that the self-aligning torque increases as the steering reaction force increases, and the control unit applies the steering reaction force to the steering unit 1 based on the steering reaction force characteristic; a curvature calculation unit 34*a* that detects the curvature of a white line; a lateral force offset unit 34 (the offset unit) that calculates an offset amount that increases as the detected curvature increases and offsets the steering reaction force characteristic at the coordinates only by the offset amount in a direction corresponding to the sign of the self-aligning torque; a steering torque inference unit 342 (the curve direction steering torque detection unit) that detects the steering torque in the curve direction; and a limiter processing unit 34*e* (the offset suppression unit) that suppresses a change in the lateral force offset amount more as the detected steering torque increases in the curve direction. Thus, even if a lateral force offset amount is calculated with a delay accompanying a delay in the recognition of the camera 17, in a state in which the vehicle behavior is being generated due to a driver steering toward a curve, a change in the lateral force offset amount is suppressed. Discomfort, such as the steering force becoming lighter or heavier when traveling along a curve, due to the steering of the driver can thereby be reduced.

(2) The curve time gain setting unit 343 is configured to suppress a change in the offset amount in accordance with the steering torque in the curve direction only when the detected curvature is equal to or greater than a predetermined curvature. Thus, when traveling on a road with a small curvature, a change in the lateral force offset amount will not be excessively suppressed even if a steering torque in the curve direction has been input, and a steering assist according to the lateral force offset amount can be realized.

(3) The rate limiter 345 is configured to inhibit a change in the lateral force offset amount when the steering torque in the curve direction is equal to or greater than a predetermined value. That is, when a lateral acceleration G of equal to or greater than 0.2 G is being generated, which is when the driver can recognize that a lateral acceleration is being generated due to steering, discomfort, in which the steering force becomes lighter or heavier when traveling along a curve, due to the steering of the driver can be reduced by inhibiting a change in the lateral force offset amount.

(4) The steering reaction force characteristic is configured so that the change amount of the steering reaction force with respect to the change amount of the self-aligning torque increases when the self-aligning torque is smaller, as compared to when greater. Variation in the steering angle with respect to the change in the steering retention torque can thereby be made to be smaller as the curvature of the curve increases, and the sensitivity of the vehicle with respect to the steering torque can be kept low; as a result, facilitating the adjustment of the course by the driver while turning is possible. Additionally, since the steering retention torque for maintaining the steering angle can be made to be smaller, the steering load of the driver while turning can be reduced.

(5) The present invention sets a steering reaction force characteristic to coordinates, of which the coordinate axes are the self-aligning torque and the steering reaction force, so that the self-aligning torque increases as the steering reaction force increases; upon applying a steering reaction force to a steering unit 1 that is mechanically separated from a turning unit 2 based on the steering reaction force characteristic, a lateral force offset amount that increases as the curvature of the white line increases is calculated; upon offsetting the steering reaction force characteristic at the coordinates a direction corresponding to the sign of the self-aligning torque, a change in the lateral force offset amount is suppressed more as the detected turning torque in the curve direction increases. Thus, even if a lateral force offset amount is calculated with a delay accompanying a delay in the recognition of the camera 17, in a state in which the vehicle behavior is being generated due to a driver steering toward a curve, a change in the lateral force offset amount is suppressed. Discomfort, such as the steering force becoming lighter or heavier when traveling along a curve, due to the steering of the driver can thereby be reduced.

(6) The present invention comprises a camera 17 and a curvature calculation unit 34*a* (a sensor) that detect a curvature of a white line, a lateral acceleration inference unit 342 (a sensor) that detects a lateral acceleration, and an SBW controller 4 (a controller) that sets a steering reaction force characteristic to coordinates, of which the coordinate axes are the self-aligning torque and the steering reaction force, so that the self-aligning torque increases as the steering reaction force increases; upon applying a steering reaction force to a steering unit 1 that is mechanically separated from a turning unit 2 based on the steering reaction force characteristic, an offset amount that increases as the curvature of the white line increases is calculated; and upon offsetting the steering reaction force characteristic at the coordinates a direction corresponding to the sign of the self-aligning torque, an increase in the lateral force offset amount is suppressed more as the detected steering torque in the curve direction increases. Thus, even if a lateral force offset amount is calculated with a delay accompanying a delay in the recognition of the camera 17, in a state in which a vehicle behavior is being generated due to a driver steering toward a curve, a change in the lateral force offset amount is suppressed. Discomfort, such as the steering force becoming lighter or heavier when traveling along a curve, due to the steering of the driver can thereby be reduced.

The invention claimed is:

1. A steering control device comprising:
a steering unit mechanically separated from a turning unit for turning a turnable wheel of a vehicle, the steering unit including
a steering member configured to receive a steering torque inputted from a driver,
a reaction force motor arranged to exert a steering reaction force torque opposing the steering torque, and
a steering angle sensor configured and arranged to detect a steering angle of the steering member, the steering angle being expressed in terms of an angle value and a sign, the sign indicating a curve direction corresponding to a direction in which the steering member is turned by the driver; and
a steering reaction force controller programmed to control the steering reaction force torque exerted by the reaction force motor such that the steering torque inputted to the steering member and the steering angle of the steering member are related according to a steering characteristic in which a magnitude of the steering torque increases as the steering angle of the steering member increases or decreases from a steering torque neutral position of the steering characteristic, the steering torque neutral position being a position defined by a steering angle at which the steering torque is zero, the steering reaction force controller including a curvature detection unit programmed to calculate a curvature of a white line based on white line data received from an image capturing device, an offset unit programmed to calculate an offset amount that increases as a magnitude of the detected curvature increases and to offset the steering characteristic by the offset amount from a reference steering torque neutral position where both the steering torque and the steering angle are zero, the steering characteristic being offset such that the steering torque neutral position is changed in a direction corresponding to the sign of the detected steering angle, a curve direction steering torque detection unit programmed to detect the steering torque of the steering unit in the curve direction indicated by the sign of the detected steering angle; and an offset suppression unit programmed to execute a suppression of changes in the offset amount in accordance with a magnitude of the detected steering torque in the curve direction such that changes in the offset amount are suppressed more as the magnitude of the detected steering torque increases.

2. The steering control device according to claim 1, wherein
the offset suppression unit is further programmed to suppress changes in the offset amount in accordance with the steering torque in the curve direction only when the detected curvature is equal to or greater than a predetermined curvature.

3. The steering control device according to claim 1, wherein
the offset suppression unit is further programmed to inhibit changes in the offset amount when the detected steering torque in the curve direction is equal to or greater than a predetermined value.

4. The steering control device according to claim 1, wherein
the steering characteristic is configured so that a change amount of the steering angle with respect to a change amount of the steering torque is larger when a difference between the detected steering angle and the steering angle at the steering torque neutral position is large than when the difference between the detected steering angle and the steering angle at the steering torque neutral position is small.

5. A steering control device for a vehicle equipped with a steering unit mechanically separated from a turning unit for turning a turnable wheel of the vehicle, the steering control device comprising:

a controller programmed to
receive a signal indicating a detected steering angle of the steering unit, the steering angle being expressed in terms of an angle value and a sign, the sign indicating a curve direction in which the steering unit is turned by the driver, set a steering characteristic definining a relationship between a steering torque of the steering unit and a steering angle of the steering unit in which a magnitude of the steering torque increases as the steering angle of the steering unit increases or decreases from a steering torque neutral position of the steering characteristic, the steering characteristic including a steering torque neutral position defined by a steering angle at which the steering torque is zero, calculate an offset amount that increases as a detected curvature of a white line increases, offset the steering characteristic by the offset amount from a reference steering torque neutral position where both the steering torque and the steering angle are zero, the steering characteristic being offset such that the steering torque neutral position is changed in a direction corresponding to the sign of the detected steering angle, and suppress a change in the offset amount in accordance with a magnitude of a detected steering torque in the curve direction such that changes in the offset amount are suppressed more as the magnitude of the detected steering torque increases.

6. The steering control device according to claim 2, wherein
the offset suppression unit is further programmed to inhibit changes in the offset amount when the detected steering torque in the curve direction is equal to or greater than a predetermined value.

7. The steering control device according to claim 2, wherein
the steering characteristic is configured so that a change amount of the steering angle with respect to a change amount of the steering torque is larger when a difference between the detected steering angle and the steering angle at the steering torque neutral position is large than when the difference between the detected steering angle and the steering angle at the steering torque neutral position is small.

8. The steering control device according to claim 3, wherein
the steering characteristic is configured so that a change amount of the steering angle with respect to a change amount of the steering torque is larger when a difference between the detected steering angle and the steering angle at the steering torque neutral position is large than when the difference between the detected steering angle and the steering angle at the steering torque neutral position is small.

9. The steering control device according to claim 1, wherein
the offset suppression unit is programmed to suppress changes in the offset amount to a gradually increasing degree when the detected steering torque in the curve direction is equal to or greater than a first predetermined value.

10. The steering control device according to claim 9, wherein
the offset suppression unit is programmed to inhibit changes in the offset amount when the detected steering torque in the curve direction is equal to or greater than a second predetermined value larger than the first predetermined value.

11. The steering control device according to claim 5, wherein
the controller is programmed to suppress changes in the offset amount to a gradually increasing degree when the detected steering torque in the curve direction is equal to or greater than a first predetermined value.

12. The steering control device according to claim 11, wherein
the controller is programmed to inhibit changes in the offset amount when the detected steering torque in the curve direction is equal to or greater than a second predetermined value larger than the first predetermined value.

13. The steering control device according to claim 5, further comprising:
- a white line curvature sensor for detecting the curvature of a white line;
- a steering angle sensor configured and arranged to detect the steering angle of the steering unit and output the signal indicating the detected steering angle; and
- a lateral acceleration sensor for detecting a lateral acceleration of a vehicle,
- the controller being programmed to estimate the steering torque in the curve direction based on the detected lateral acceleration of the vehicle.

\* \* \* \* \*